(12) United States Patent
Noba

(10) Patent No.: US 7,719,633 B2
(45) Date of Patent: *May 18, 2010

(54) LIGHT SOURCE APPARATUS

(75) Inventor: Koya Noba, Tokorozawa (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 221 days.

This patent is subject to a terminal disclaimer.

(21) Appl. No.: 11/963,529

(22) Filed: Dec. 21, 2007

(65) Prior Publication Data

US 2008/0151540 A1 Jun. 26, 2008

(30) Foreign Application Priority Data

Dec. 26, 2006 (JP) .............................. 2006-349719
Mar. 30, 2007 (JP) .............................. 2007-091196

(51) Int. Cl.
*G02F 1/1335* (2006.01)

(52) U.S. Cl. ........................................ 349/67; 362/231

(58) Field of Classification Search ................. 362/231; 349/64, 67
See application file for complete search history.

(56) References Cited

U.S. PATENT DOCUMENTS

2006/0158080 A1   7/2006   Nakano et al. .............. 313/113

2008/0259244 A1 * 10/2008 Noba ........................... 349/64

FOREIGN PATENT DOCUMENTS

| JP | 63-132215 A | 6/1988 |
| JP | 2002-244211 A | 8/2002 |
| JP | 2006-228710 A | 8/2006 |

OTHER PUBLICATIONS

Noba, U.S. Patent Application entitled "Light Source Apparatus", U.S. Appl. No. 12/042,792, filed Mar. 5, 2008.
Noba, U.S. Patent Application entitled "Light Source Apparatus and Display Apparatus Having the Same", U.S. Appl. No. 12/041,222, filed Mar. 3, 2008.

* cited by examiner

*Primary Examiner*—John A Ward
(74) *Attorney, Agent, or Firm*—Brinks Hofer Gilson & Lione

(57) ABSTRACT

A light source apparatus capable of being reduced in size and thickness and superior in light combining performance includes a prism sheet unit having two mutually parallel prism surfaces each having a plurality of mutually parallel fine prism rows. The prism rows on the two prism surfaces intersect each other at a predetermined angle in plan view. A plurality of light sources are disposed at the light entrance surface side of the prism sheet unit to emit light so that the light is incident on the light entrance surface of the prism sheet unit at a predetermined angle thereto. The lights from the light sources are combined or color-mixed together by passing through the two prism surfaces, and the resulting combined or color-mixed light is emitted as exiting light.

20 Claims, 22 Drawing Sheets

[Fig. 1]
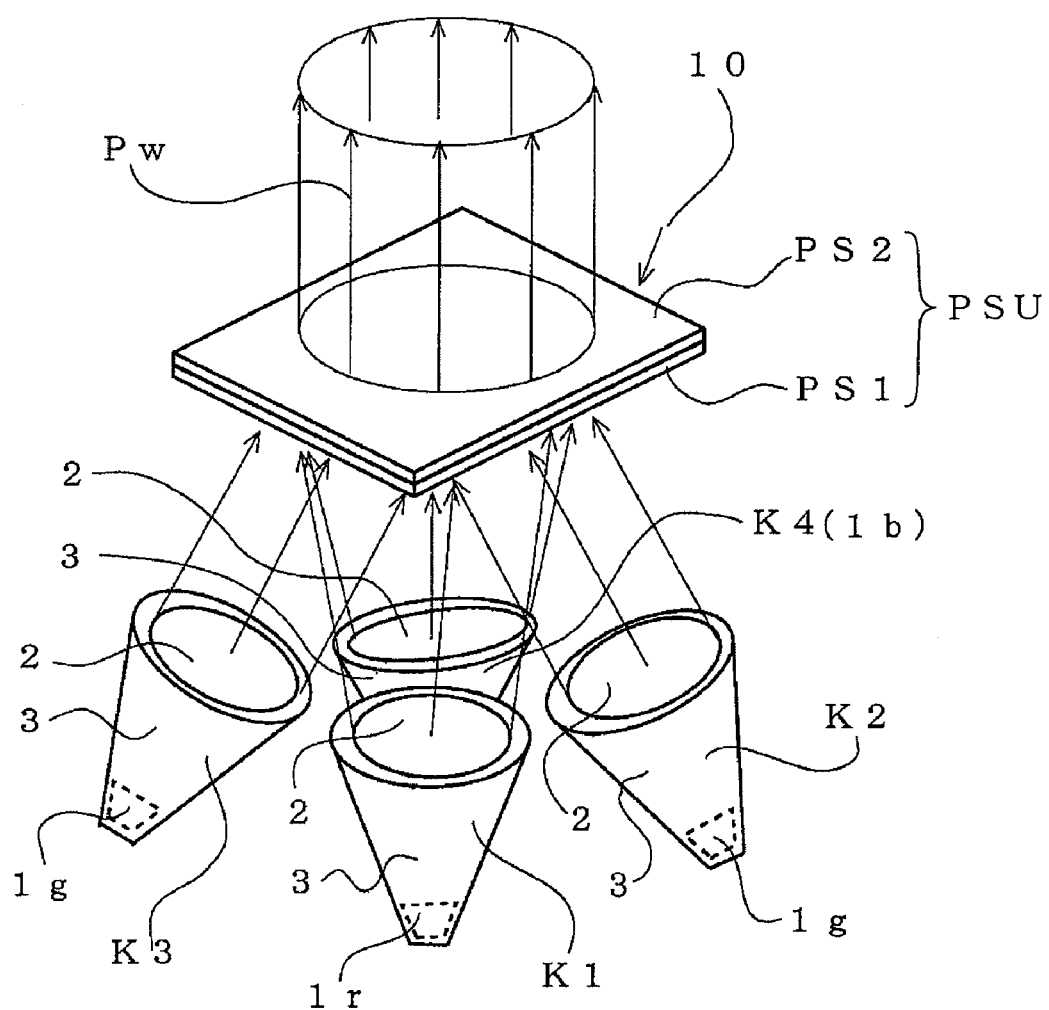

[Fig. 2]
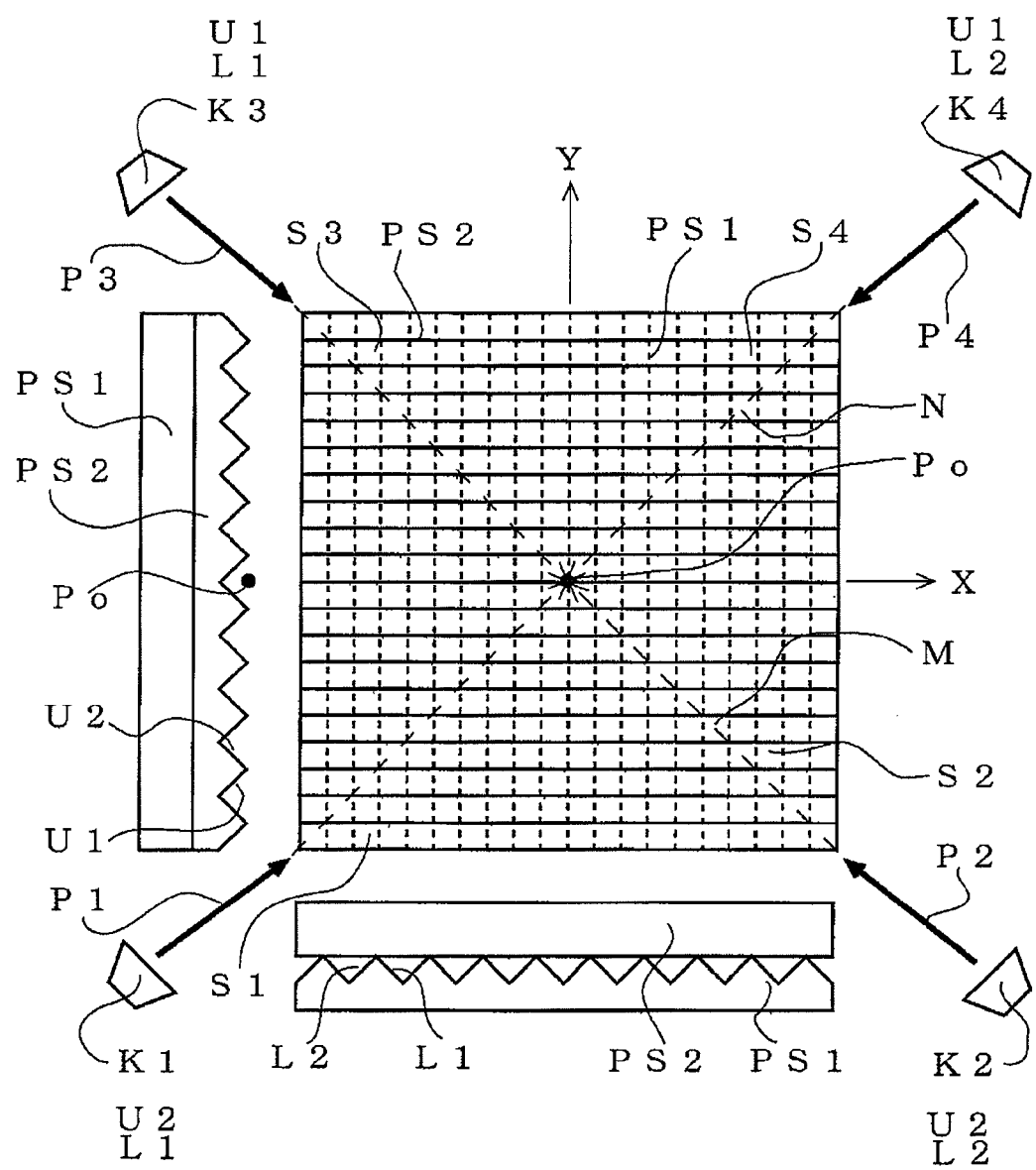

[Fig. 3]
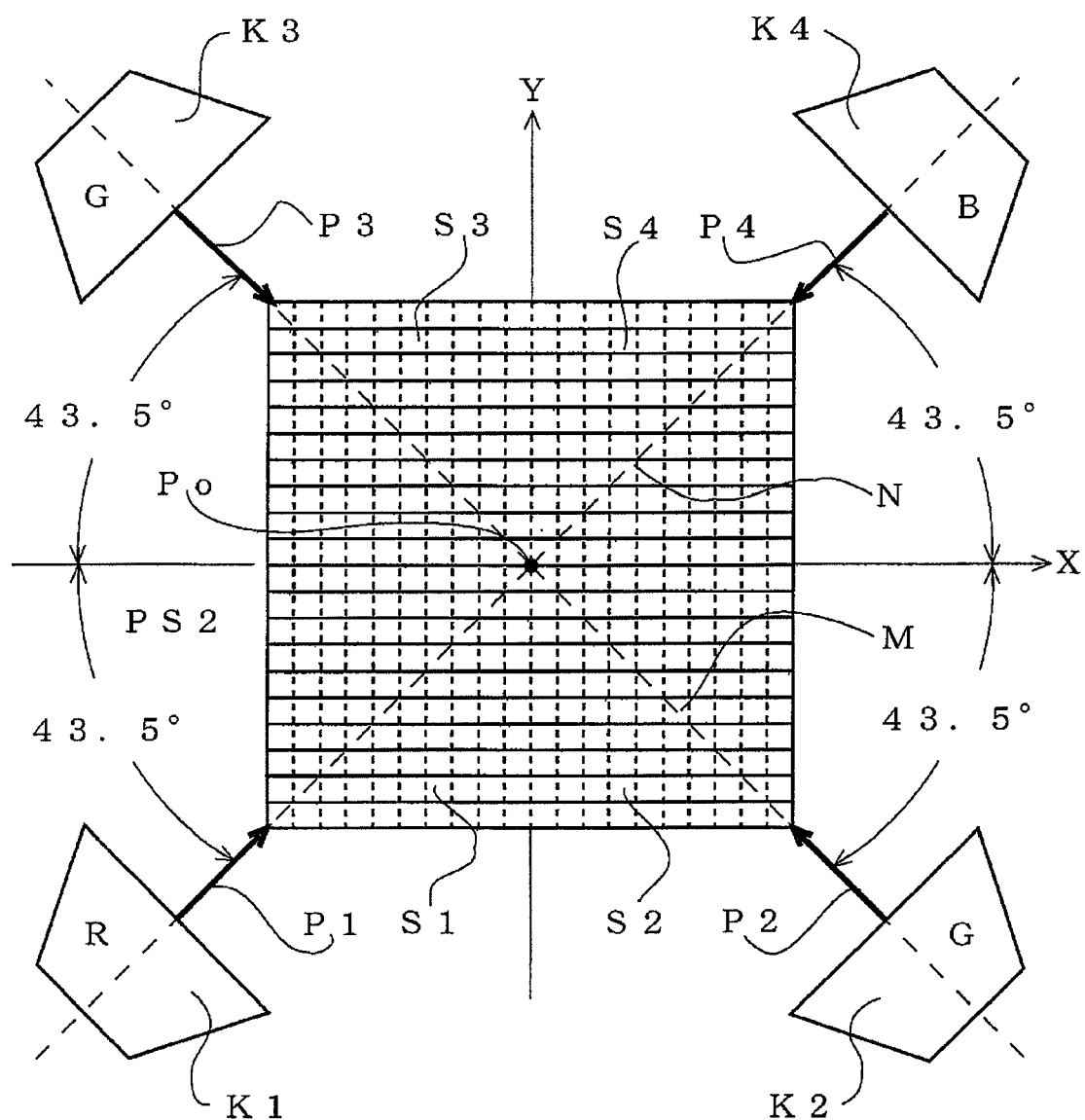

[Fig. 4]
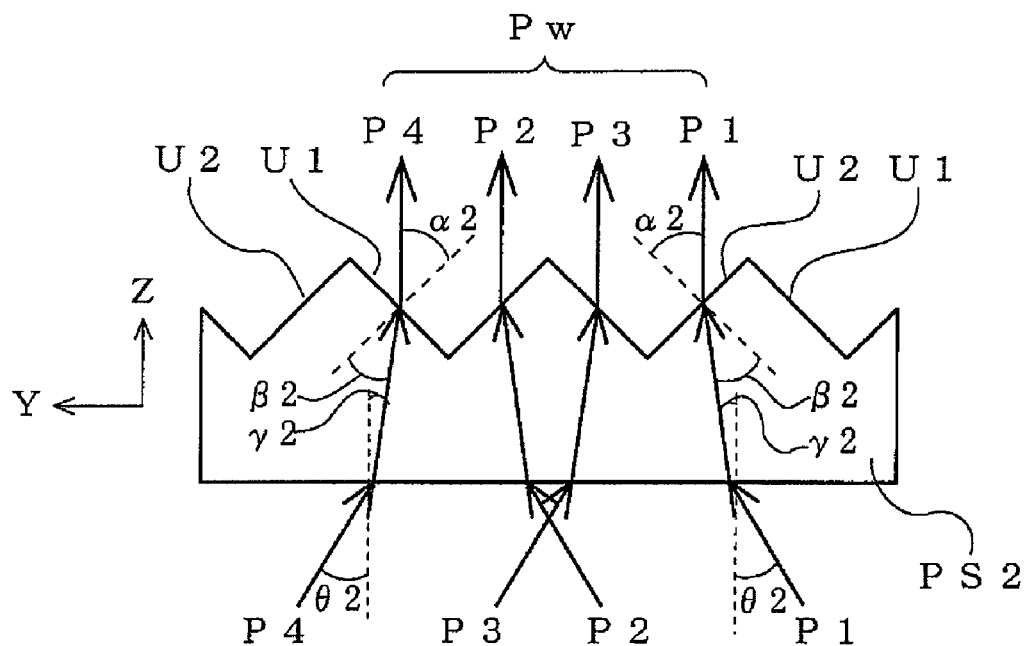
[Fig. 5]
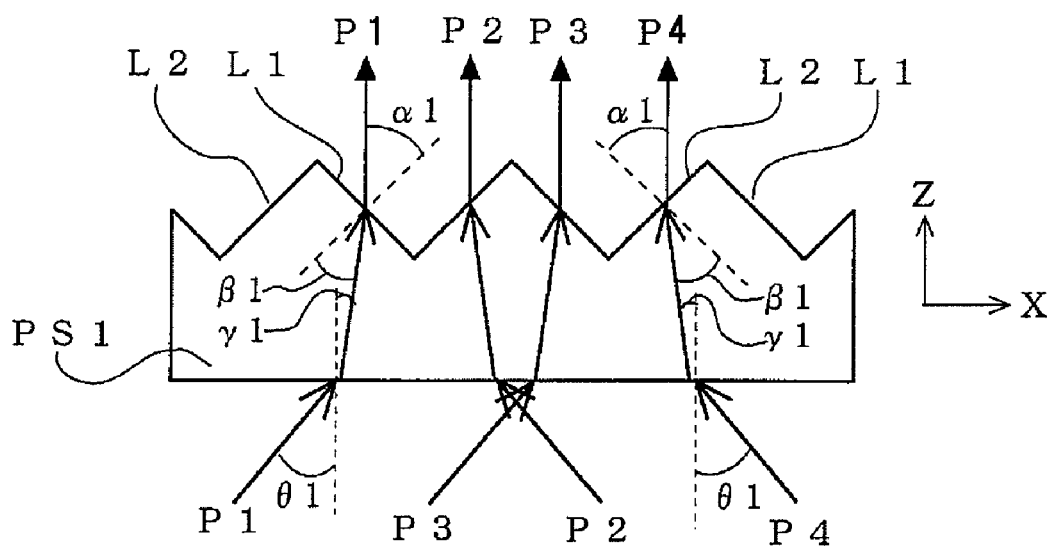

[Fig. 6]
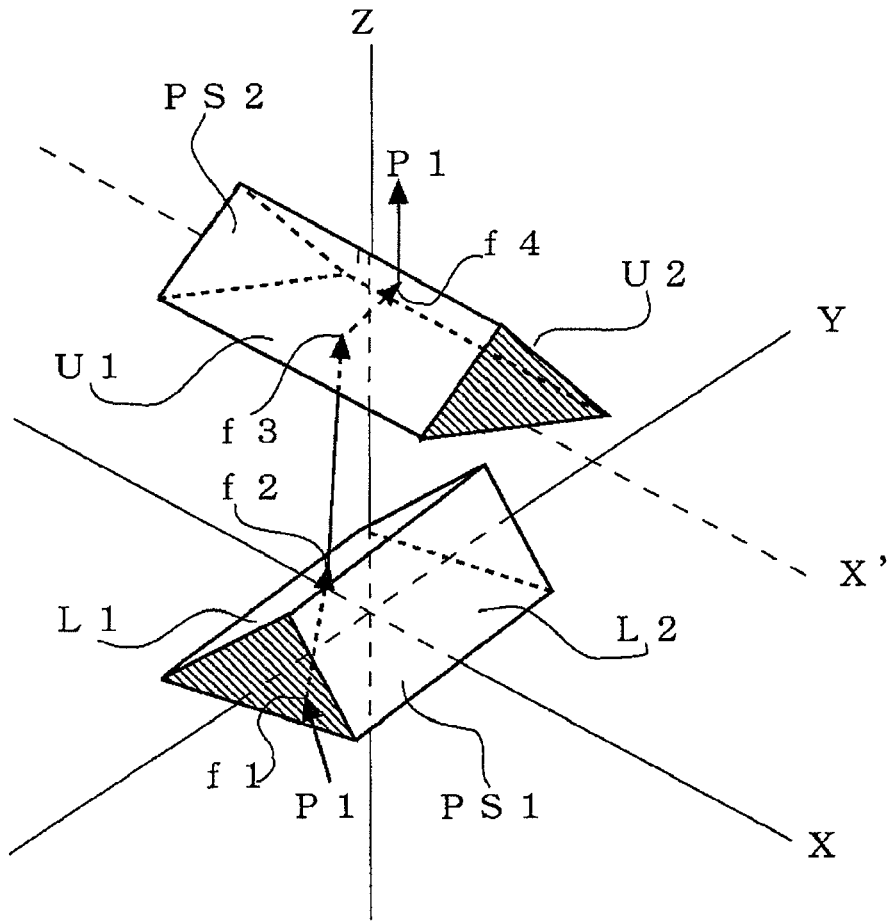
[Fig. 7]
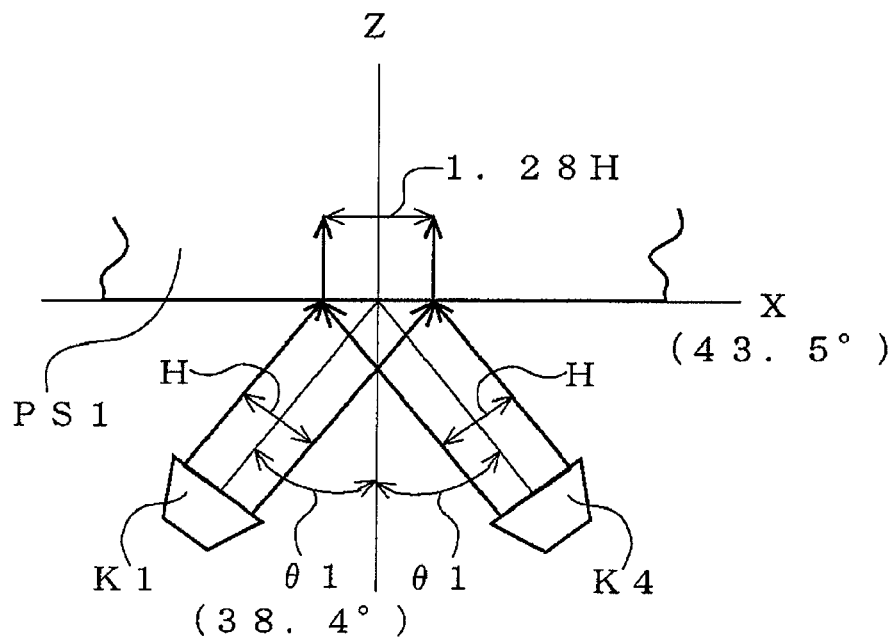

[Fig. 8]
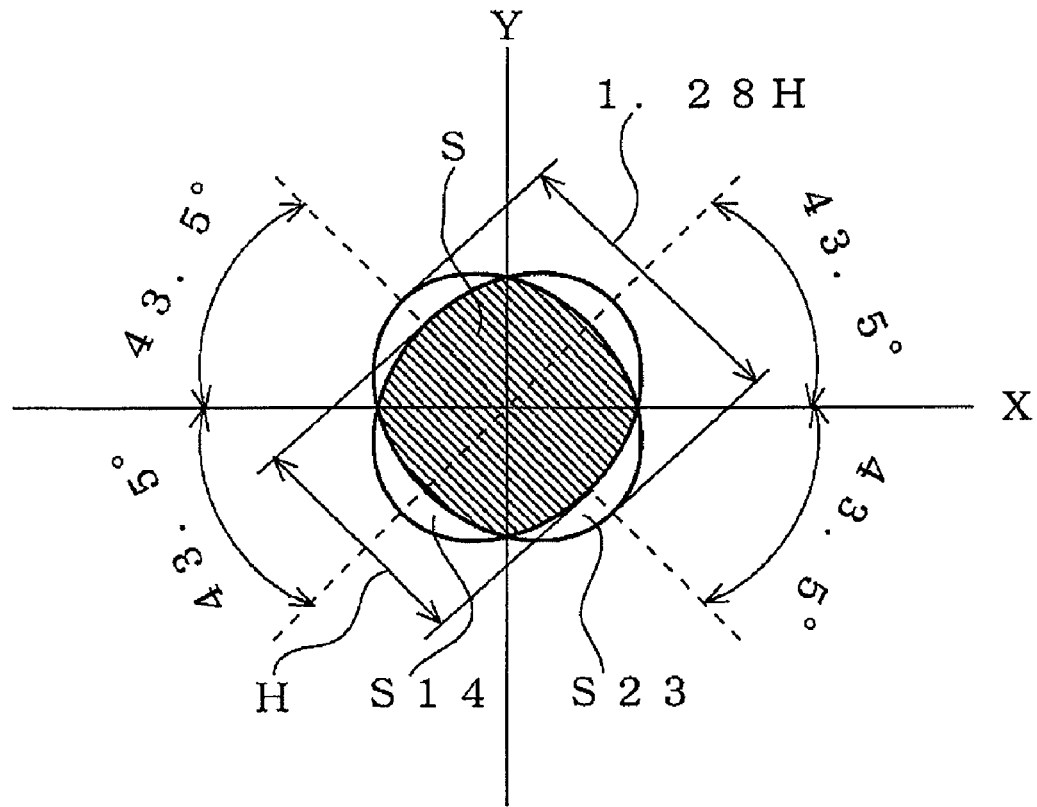
[Fig. 9]
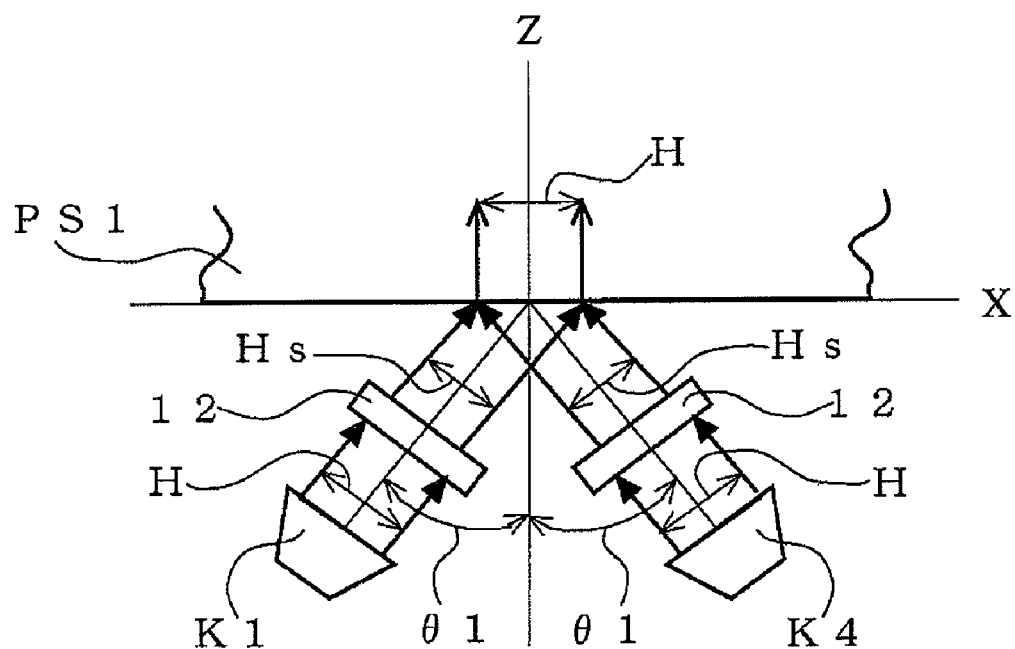

[Fig. 10a]
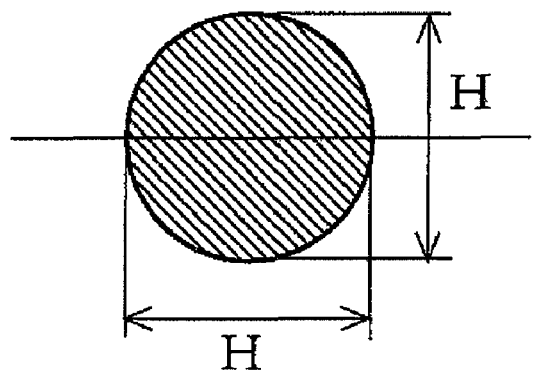
[Fig. 10b]
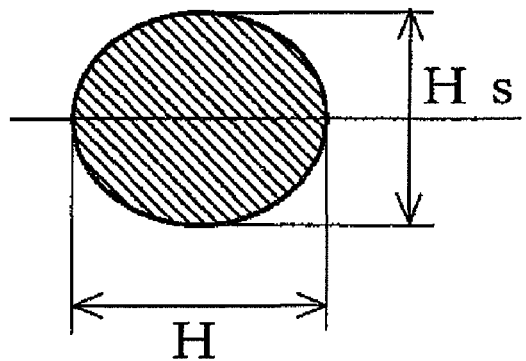
[Fig. 11]
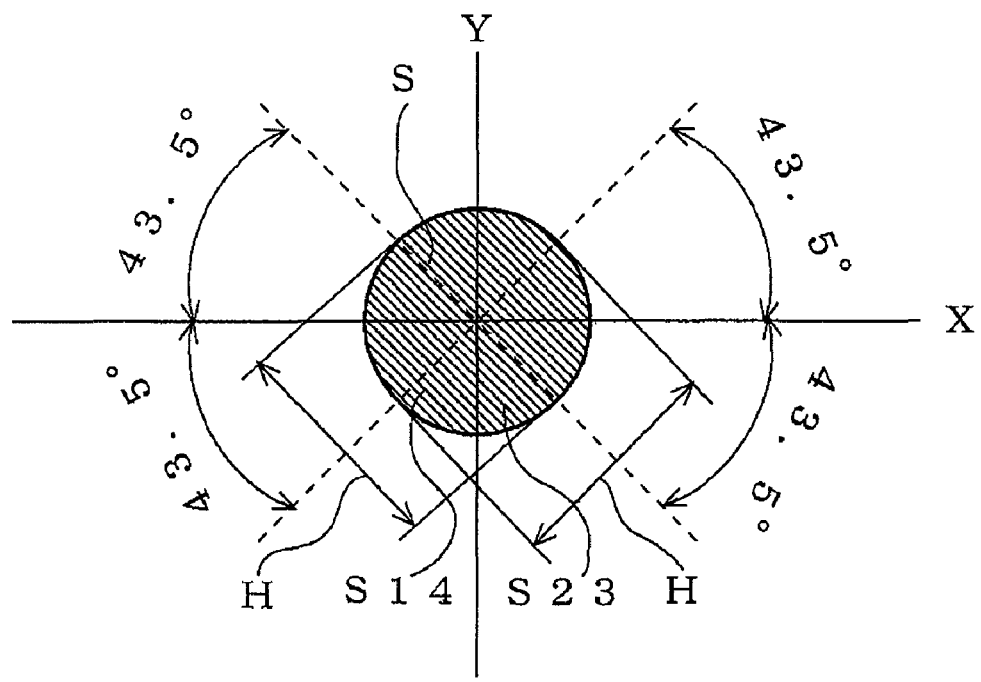

[Fig. 12]
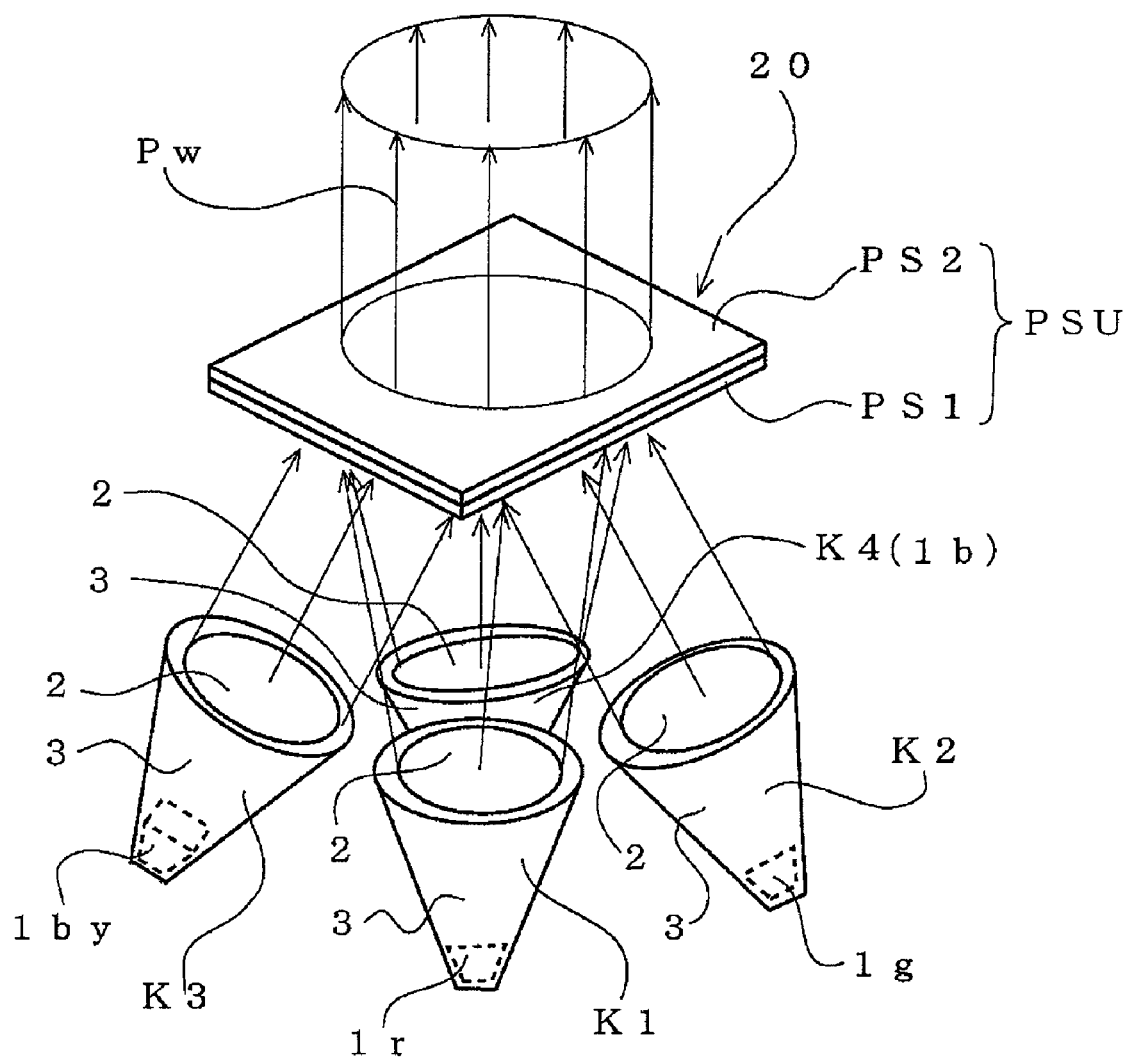

[Fig. 13]
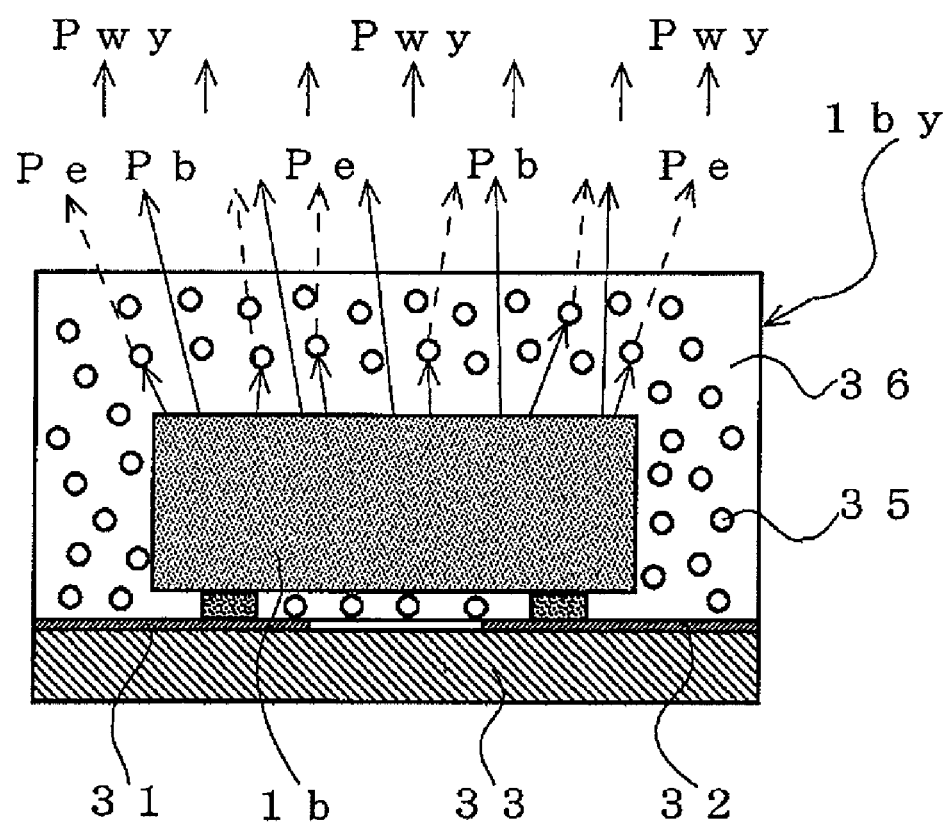

[Fig. 14]
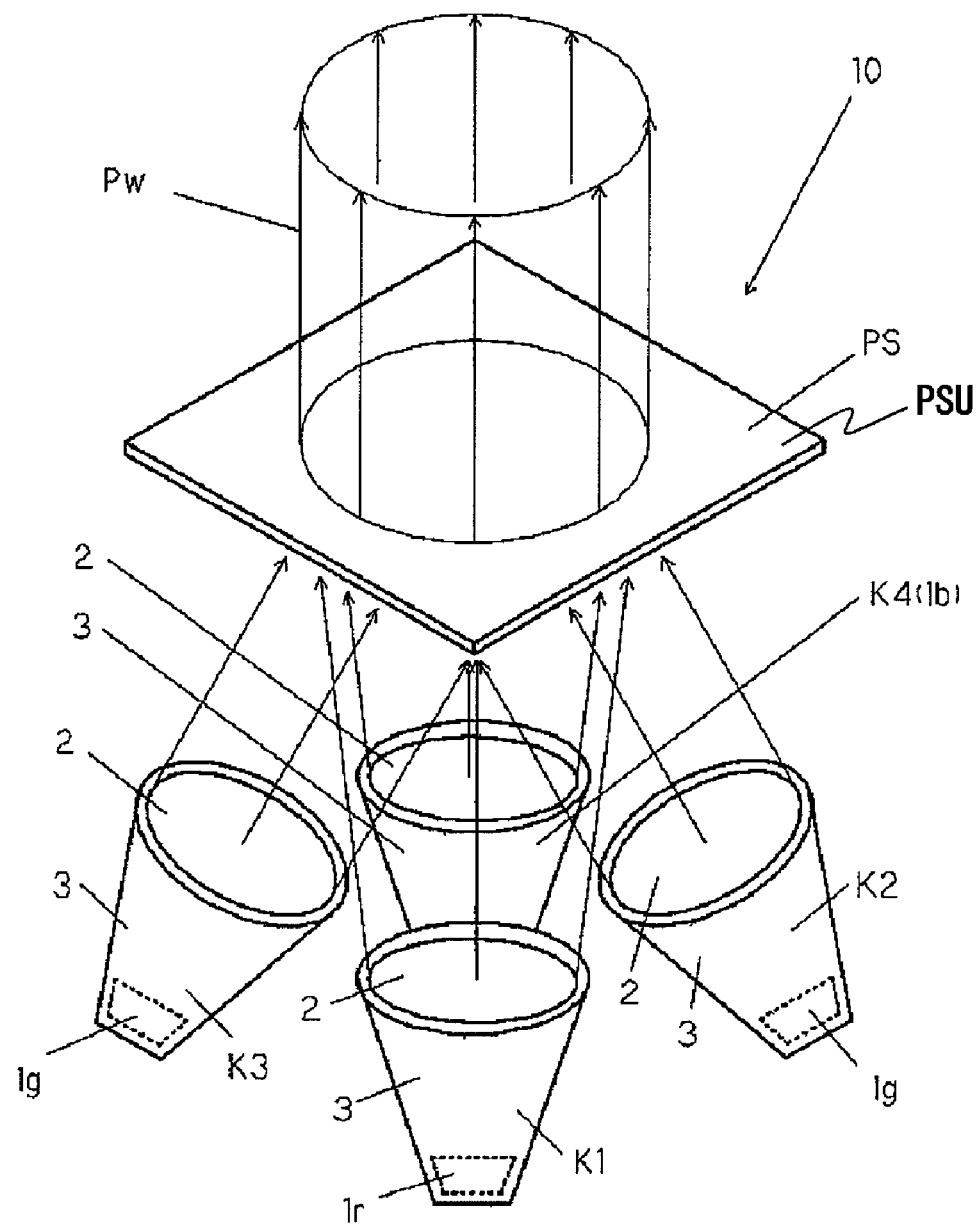

[Fig. 15]
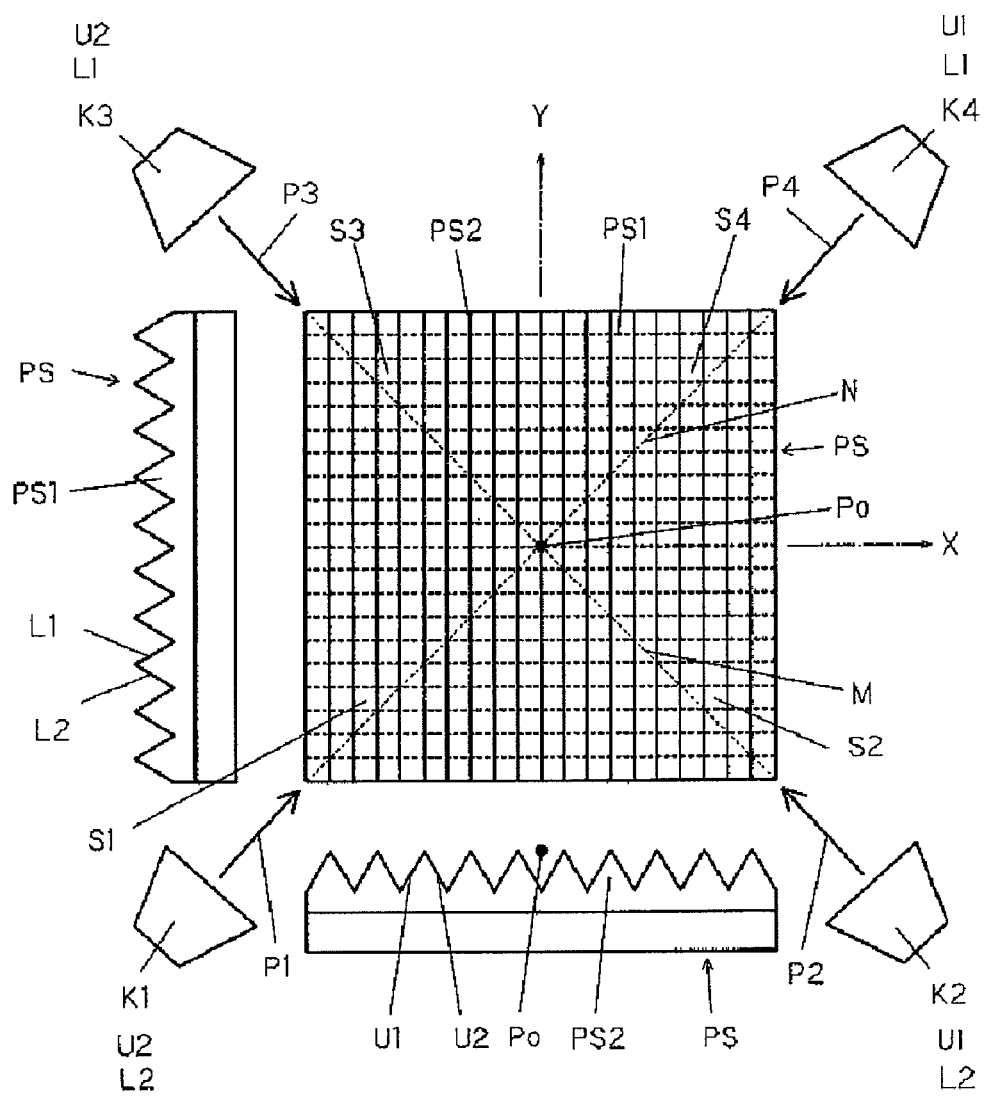

[Fig. 16]
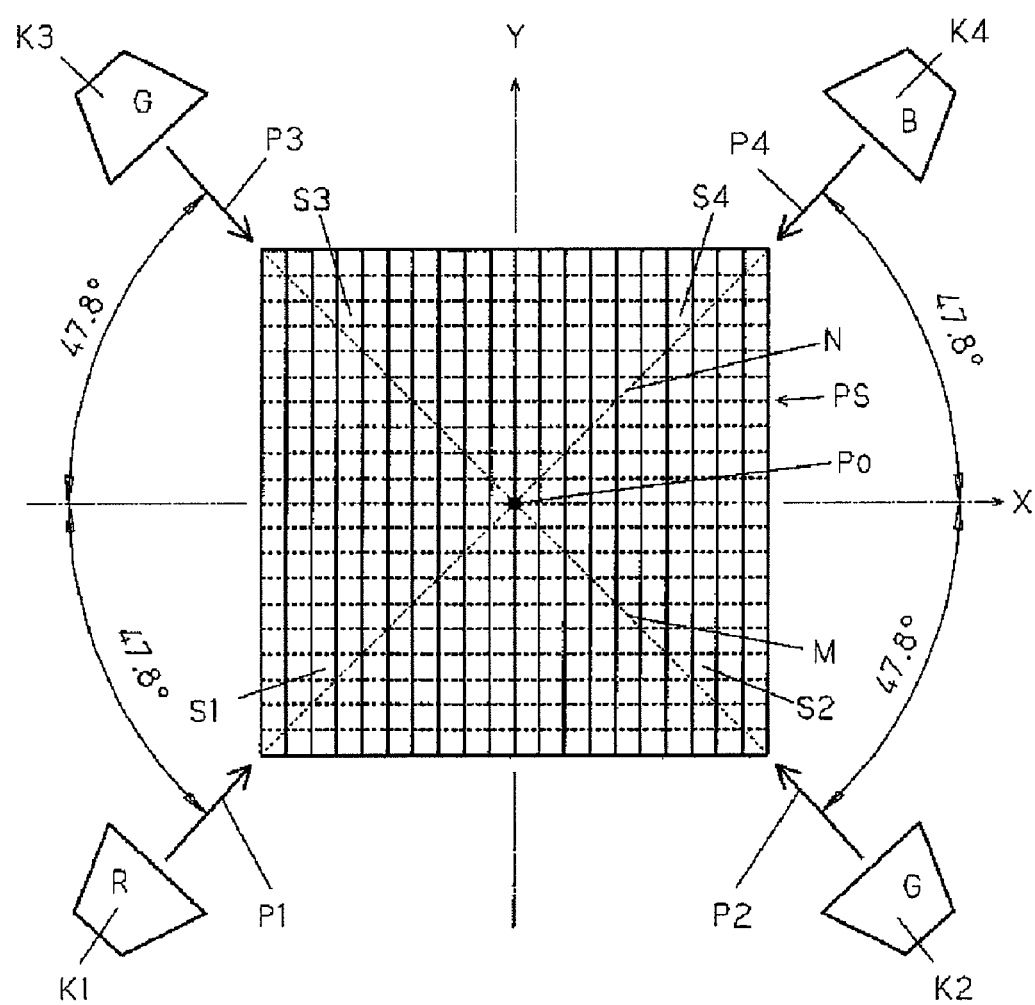

[Fig. 17]
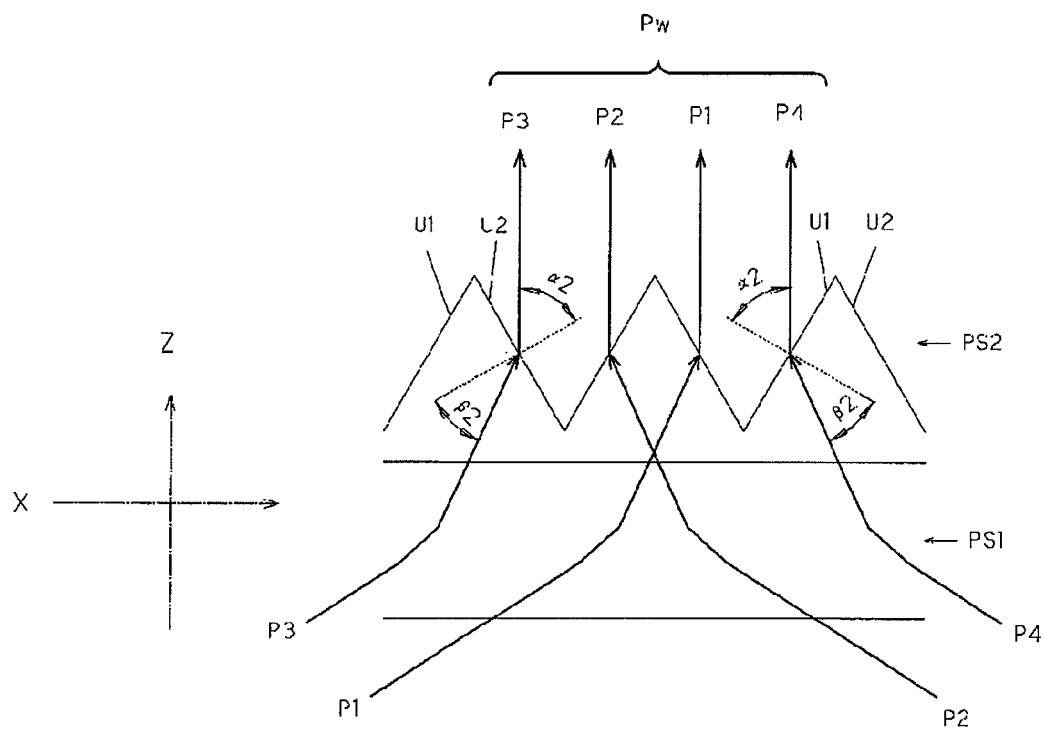
[Fig. 18]
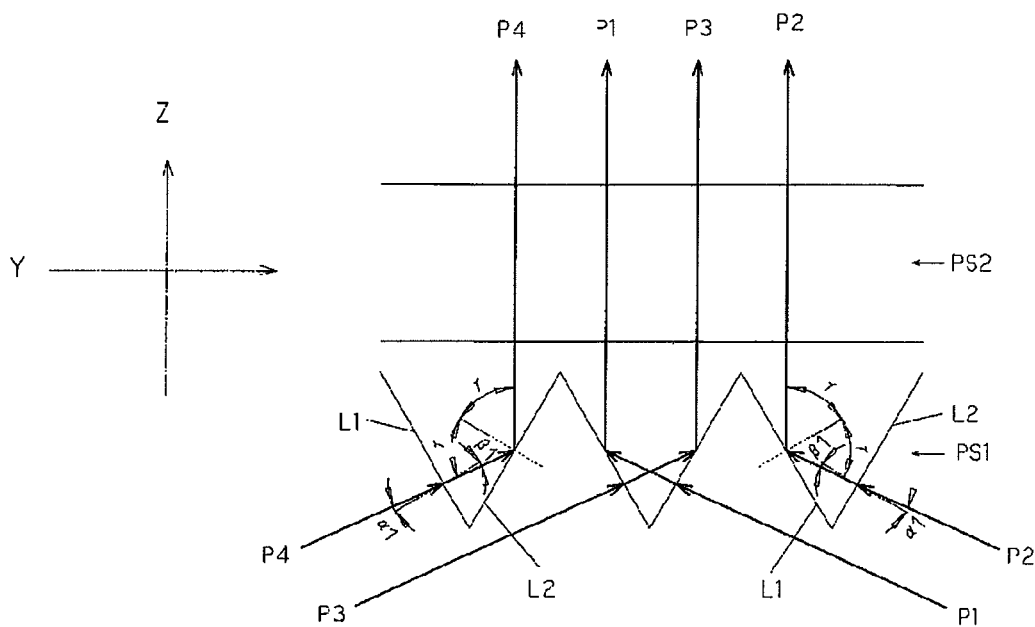

[Fig. 19]
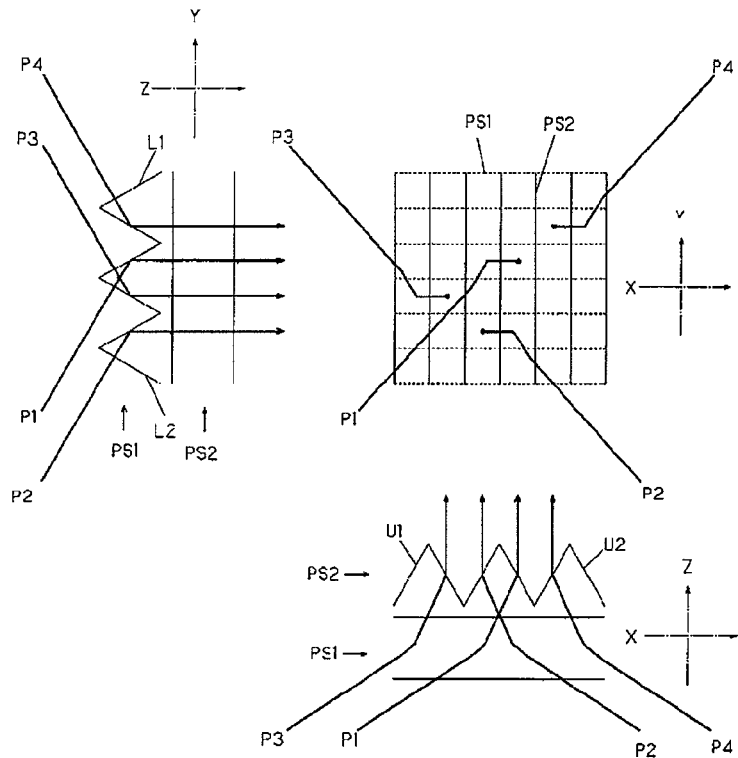
[Fig. 20]
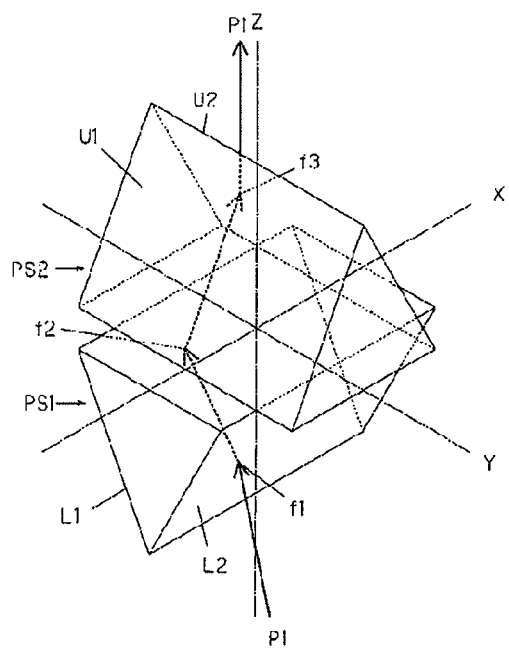

[Fig. 21]
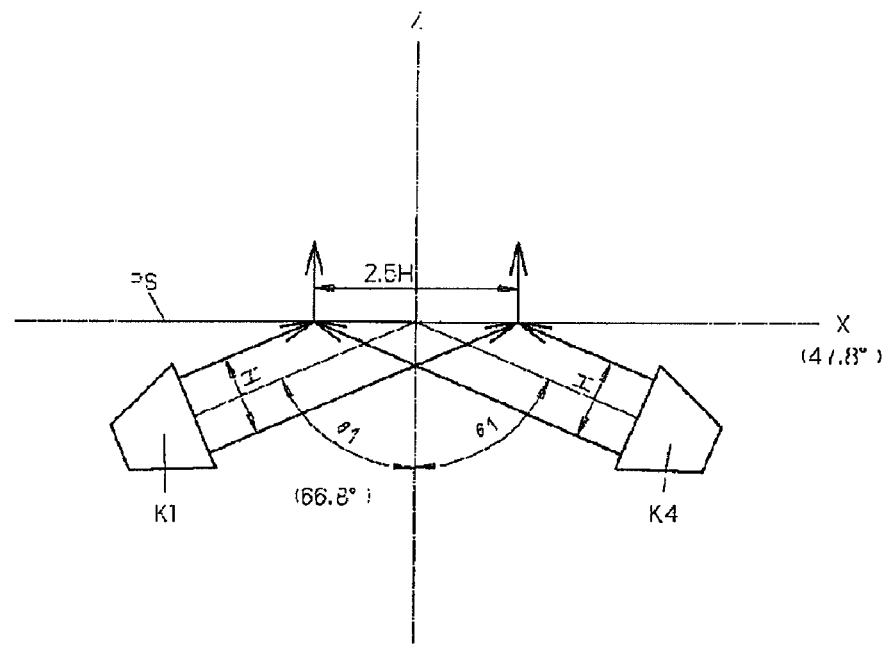
[Fig. 22]
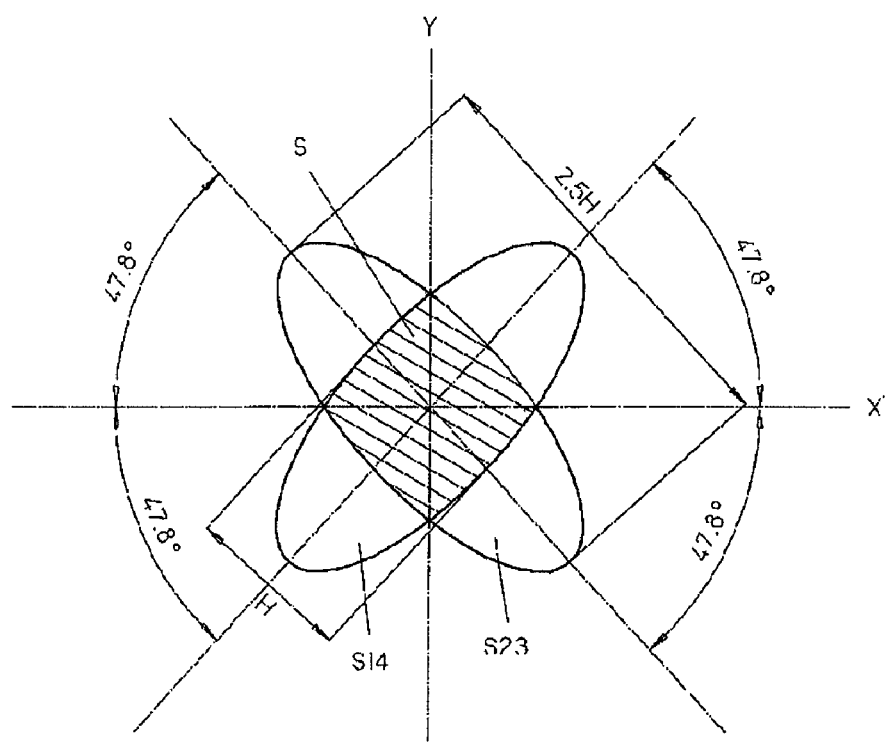

[Fig. 23]
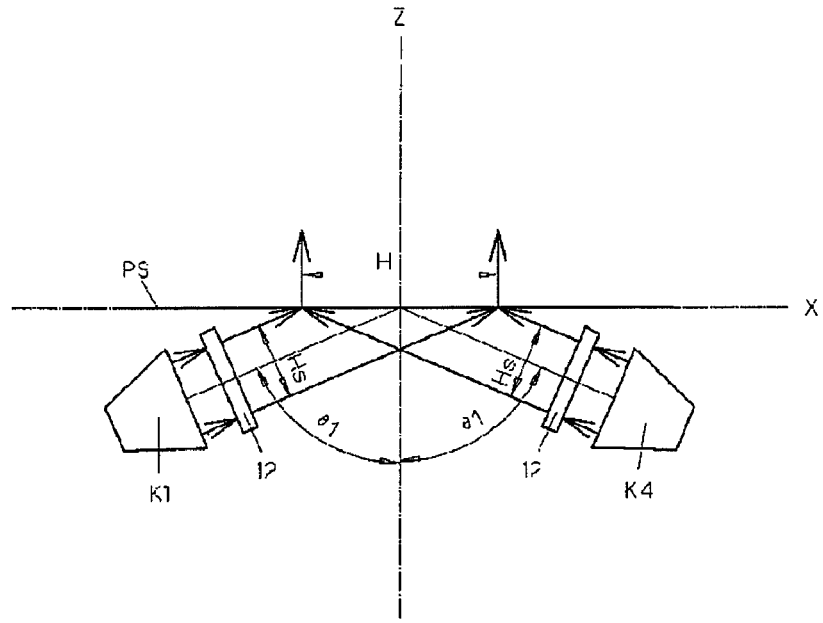
[Fig. 24a]
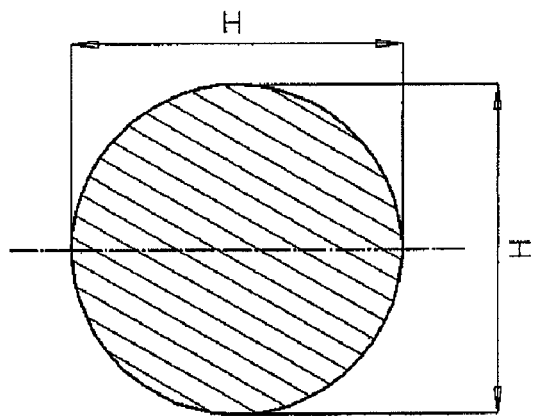
[Fig. 24b]
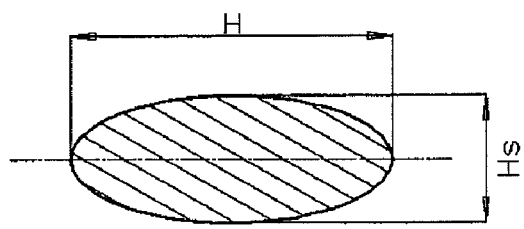

[Fig. 25]
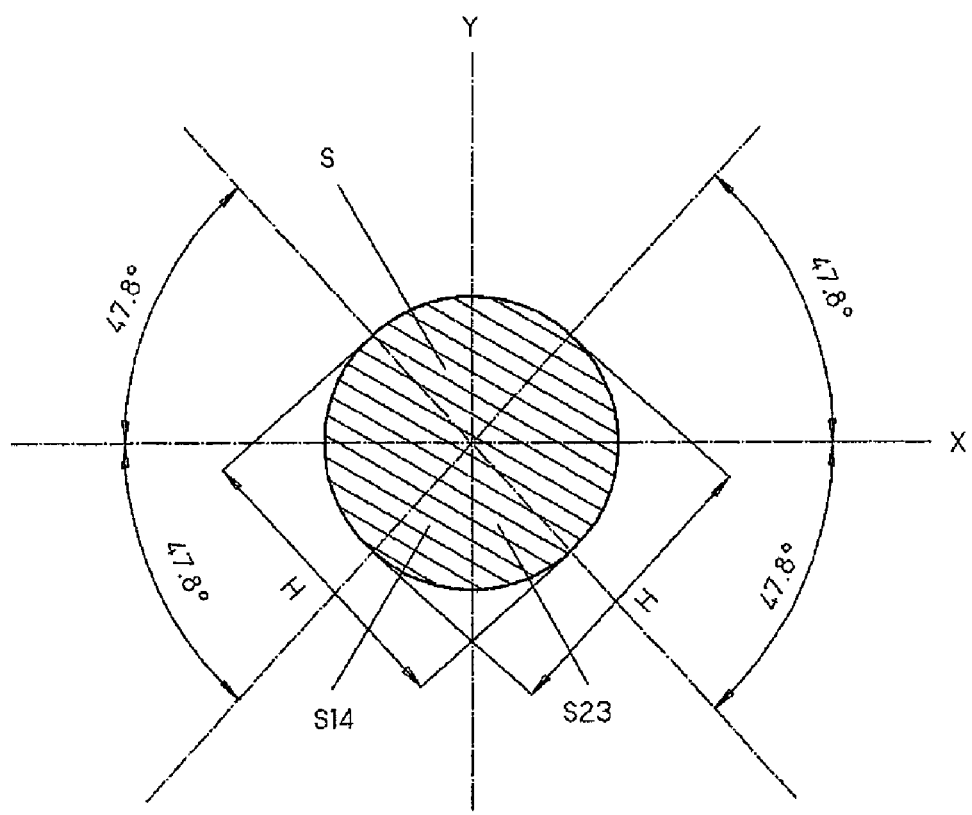

[Fig. 26]
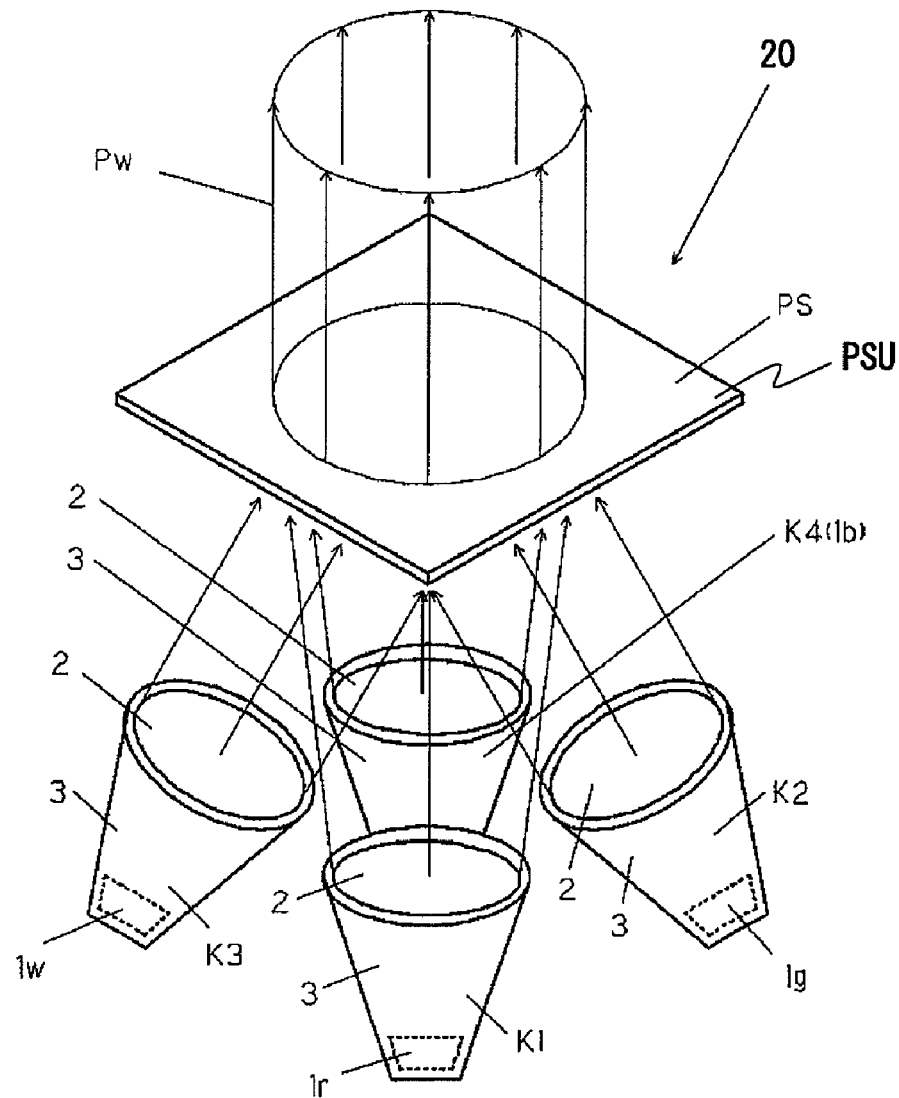

[Fig. 27]
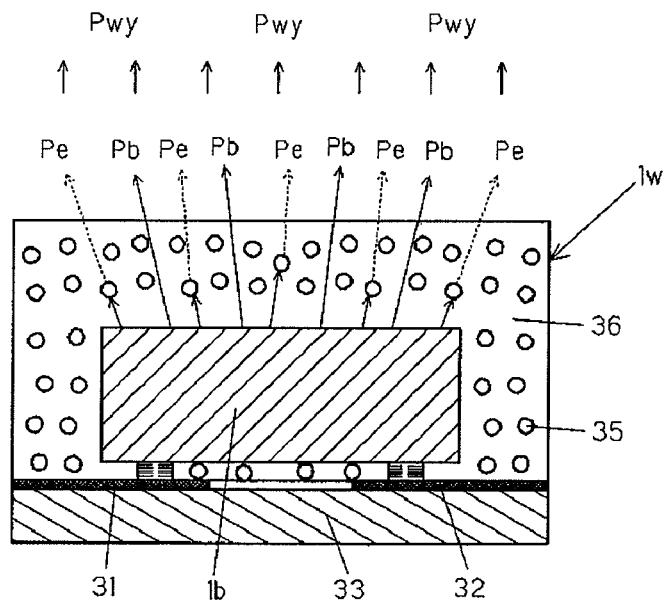
[Fig. 28]
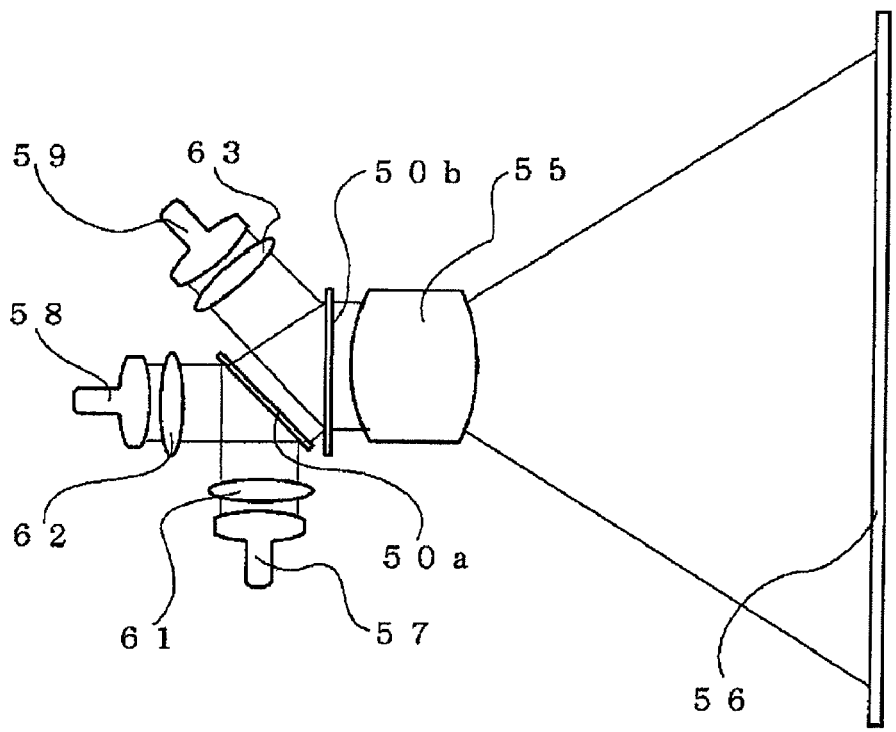

[Fig. 29]
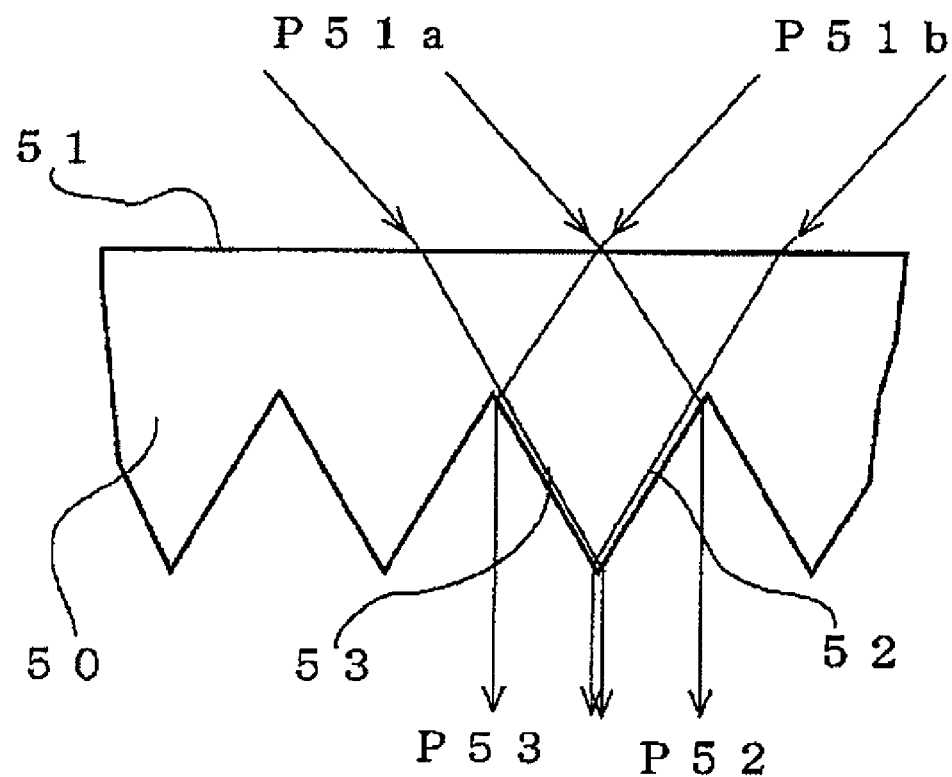

[Fig. 30]
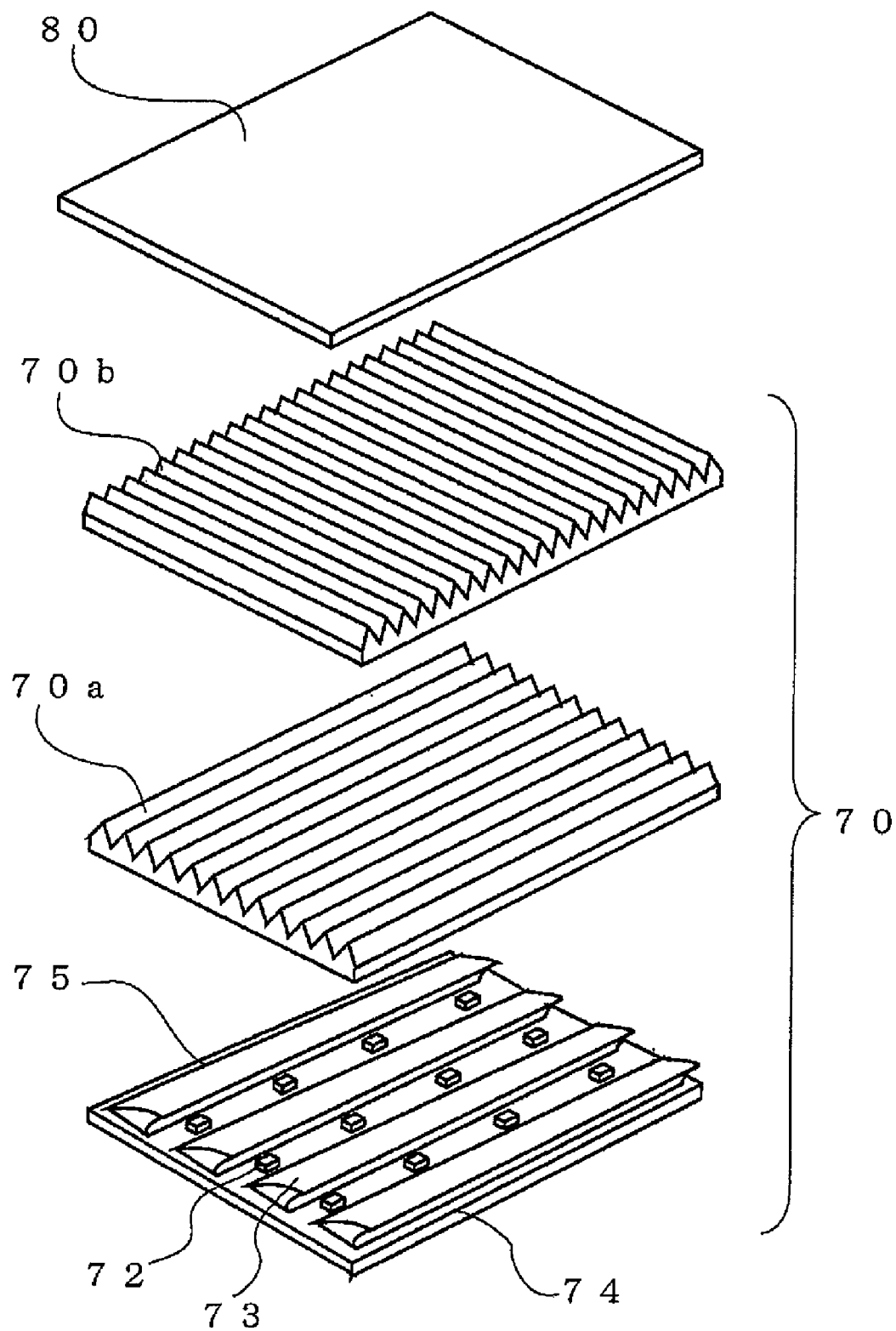

[Fig. 31]
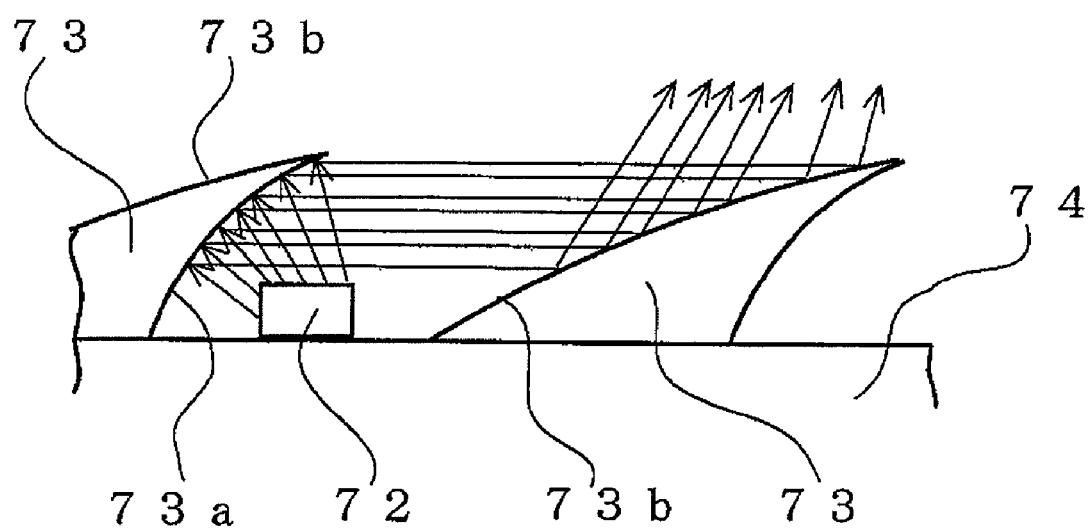

LIGHT SOURCE APPARATUS

RELATED APPLICATIONS

This application claims priority under 35 U.S.C. §119 to Japanese Patent application No. JP2006-349719 filed on Dec. 26, 2006 and Japanese Patent application No. JP2007-091196 filed on Mar. 30, 2007, the entire contents of which are hereby incorporated by reference.

TECHNICAL FIELD

The present invention relates to a light source apparatus that combines or color-mixes together incident light from a plurality of light sources and emits the combined or color-mixed light. More particularly, the present invention relates to a light source apparatus capable of being reduced in size and thickness.

RELATED CONVENTIONAL ART

There have heretofore been display systems using color light sources, such as color projectors, projection type color television systems, and liquid crystal display systems using a backlight unit and so forth. One type of light source apparatus used in these systems, e.g. color projectors and projection type color television systems, employs a dichroic prism (for example, see Japanese Patent Application Publication No. 2002-244211). This type of light source apparatus suffers from disadvantages, however, because the dichroic prism is a costly member, the overall cost of the apparatus increases unfavorably. In addition, this type of light source apparatus essentially involves a large loss in light quantity. To solve these disadvantages, there has been proposed a light source apparatus that uses linear prisms to convert a plurality of beams of light into a single beam (for example, see Japanese Patent Application Publication No. Sho 63-132215). As a backlight unit for liquid crystal display systems and the like, a light source apparatus has been proposed in which light emitted from an LED (light-emitting diode) light source is passed through two prism sheets to enhance the uniformity of luminance (for example, see Japanese Patent Application Publication No. 2006-228710).

The arrangements of the conventional light source apparatus will be explained below with reference to the accompanying drawings. FIGS. 28 and 29 show an arrangement of a color projector disclosed in Japanese Patent Application Publication No. Sho 63-132215. FIG. 28 is a schematic view showing the arrangement of the color projector. FIG. 29 is a fragmentary sectional view of a part of a linear prism plate shown in FIG. 28. In FIG. 29, a linear prism plate 50 has an upper surface serving as an exit surface having a multiplicity of prism rows and a lower surface constituting a plane light entrance surface 51. Light P51a and P51b incident on the light entrance surface 51 of the linear prism plate 50 from two different oblique directions are refracted by the light entrance surface 51 and thereafter respectively refracted by two exit surfaces 52 and 53 of each prism to exit as light P52 and P53 traveling in the same direction.

That is, by appropriately designing the refractive index of the linear prism plate 50, which is determined by the constituent material thereof, and the prism apex angle (tip angle), two light incident on the prism rows from two orthogonal directions are respectively refracted by two exit surfaces of each prism to exit in the same direction. Based on this principle, incident light from two different kinds of light sources can be combined together and emitted as single combined light. If the two different kinds of light sources emit different colors of light, the two colors of light can be emitted as mixed light. If it is desired to combine together light from three or more different kinds of light sources, combining of light is repeatedly by using a plurality of linear prism plates 50 to obtain combined light.

FIG. 28 shows a color projector having a light source apparatus that combines together three colors of light, i.e. red (hereinafter referred to as "R"), green (hereinafter referred to as "G") and blue (hereinafter referred to as "B"), by using two linear prism plates 50. In the figure, linear prism plates 50a and 50b have the same structure as that of the above-described linear prism plate 50. Reference numerals in FIG. 28 are used to denote as follows: 55 is a projection lens; 56 is a projection screen; 57 is an R light source; 58 is a G light source; 59 is a B light source; and 61, 62 and 63 are relay lenses of the R, G and B light sources 57, 58 and 59.

The R light source 57 and the G light source 58 are arranged to face the light entrance surface of the linear prism plate 50a at an angle of 45° in different directions. R light and G light emitted from the R light source 57 and the G light source 58 are passed through the respective relay lenses 61 and 62 to become parallel beams before being incident on the light entrance surface of the linear prism plate 50a and then are incident on the light entrance surface from mutually different 45° oblique directions. The two incident light R and G are combined together by the linear prism plate 50a and exit as single light from the exit surface of the linear prism plate 50a in a direction perpendicular thereto. The combined light exiting the linear prism plate 50a is incident on the light entrance surface of the linear prism plate 50b, which is disposed at an angle of 45° to the linear prism plate 50a, from a 45° oblique direction.

B light emitted from the B light source 59 is collimated into parallel rays through the relay lens 63 before being incident on the light entrance surface of the linear prism plate 50b from a 45° oblique direction different from the incidence direction of the single light synthesized from R and G light. As a result, the R and G combined single light and the B light are combined together by the linear prism plate 50b and emitted as single light synthesized from R, G and B light from the exit surface of the linear prism plate 50b in a direction perpendicular thereto.

Next, the arrangement of a planar light-emitting apparatus disclosed in Japanese Patent Application Publication No. 2006-228710 will be explained with reference to FIGS. 30 and 31. FIG. 30 is an exploded perspective view of the planar light-emitting apparatus. FIG. 31 is a fragmentary enlarged side view showing the way in which light is emitted from a light-emitting substrate 75 shown in FIG. 30. In FIG. 30, a planar light-emitting apparatus 70 has two prism sheets 70a and 70b stacked in such a manner that respective prism rows extend perpendicular to each other. A light-emitting substrate 75 is disposed underneath the stack of two prism sheets 70a and 70b. The light-emitting substrate 75 comprises a retaining substrate 74 having a plurality of LEDs 72 and a plurality of reflectors 73. A liquid crystal unit 80 is disposed directly above the planar light-emitting apparatus 70 to constitute a liquid crystal display system using the planar light-emitting apparatus 70 as a backlight unit.

The light-emitting substrate 75 has a plurality of LEDs 72 arranged thereon in a matrix. The reflectors 73 are each disposed to cover one row of LEDs 72 all together. As shown in FIG. 31, which is a fragmentary enlarged side view of the light-emitting substrate 75, each reflector 73 has a first surface 73a facing the light-emitting surfaces of the LEDs 72 to receive light and a second surface 73b that connects the first surface 73b at the top thereof. Light emitted from the LEDs 72 is reflected sideward by the first surface 73a of one reflector 73 and incident on the next reflector 73. The incident light is reflected upward by the second surface 73b of the next reflector 73 to enter the two stacked prism sheets 70a and 70b. The stacked prism sheets 70a and 70b adjust the optical path of reflected light from the second surfaces 73b of the reflectors 73 disposed on the light-emitting substrate 75 so that the light exits upward (toward the liquid crystal unit 80).

The planar light-emitting apparatus 70 arranged as stated above emits white light as backlight. Accordingly, the light-emitting substrate 75 is adapted to emit white light. In this regard, white LEDs are roughly divided into two types: one type in which an LED having a specific emission wavelength is combined with a fluorescent substance; and another type in which three R, G and B LEDs are disposed in one package. Either type is usable. It is also possible to implement a planar white light-emitting apparatus by using three different types of LEDs, i.e. R, G and B LEDs, as a plurality of LEDs 72 disposed on the light-emitting substrate 75 and arranging such that the three colors of light are reflected by the first and second surfaces 73a and 73b of the reflectors 73 so as to mix together to emit white light.

However, conventional light source apparatuses have the following problems. The light source apparatus using a dichroic prism, disclosed in Japanese Patent Application Publication No. 2002-244211, has an increased cost because the dichroic prism is a costly member that is formed by bonding together four dichroic-mirrored glass members. In addition, this type of light source apparatus essentially involves a large loss in light quantity.

The light source apparatus using linear prisms, disclosed in Japanese Patent Application Publication No. Sho 63-132215, needs to provide a spacing having a predetermined angle for placing two linear prisms to combine together light from light sources comprising LEDs emitting three colors of light, e.g. R, G and B. Therefore, the linear prisms require a widened space for installation. Accordingly, the overall size of the light source apparatus increases, and it becomes difficult to reduce the thickness of the apparatus. Further, because a beam of light is made obliquely incident on each linear prism, the width of the beam when exiting the linear prism is expanded, resulting in a difference in beam width between entrance and exit of the beam. In addition, the aspect ratio of the beam changes undesirably. The amount of change of the aspect ratio increases with the increase in the number of times of oblique light incidence on linear prisms. That is, in the case of the light source apparatus shown in FIG. 28, R light and G light are obliquely incident on the linear prism plate 50a to combine together. Thereafter, the combined single light is obliquely incident on the linear prism plate 50b to be combined with B light. Therefore, for R light and G light, oblique incidence on a linear prism is performed twice. Consequently, the amount of change of the aspect ratio doubles.

The light source apparatus using a light-emitting substrate with reflectors and two prism sheets, disclosed in Japanese Patent Application Publication No. 2006-228710, has the problem to be solved as follows. The two prism sheets are stacked in such a manner that the respective prism rows extend perpendicular to each other, but the synthesization of white light is performed on the light-emitting substrate 75. Thus, the two stacked prism sheets having their prism rows arranged orthogonally to each other are merely used to change the optical path of the synthesized light. That is, the light source apparatus requires a certain size for the light-emitting substrate and is still unsatisfactory from the viewpoint of reducing the thickness of the apparatus.

BRIEF SUMMARY

The present invention has been made in view of the above-described problems with the related conventional art. Accordingly, an object of the present invention is to provide a light source apparatus that is less costly, capable of being reduced in size and thickness and superior in light combining performance.

The present invention provides a light source apparatus including a prism sheet unit having two mutually parallel prism surfaces each having a plurality of mutually parallel fine prism rows. The prism rows on one of the two prism surfaces and those on the other intersect each other at a predetermined angle in plan view. The light source apparatus further includes a plurality of light sources disposed at the light entrance surface side of the prism sheet unit. The light sources are each designed to emit light so that the light is incident on the light entrance surface of the prism sheet unit at a predetermined angle thereto. The lights from the light sources are combined or color-mixed together by passing the light through the two prism surfaces, and the resulting combined or color-mixed light is emitted as exiting light.

In the light source apparatus of the present invention, the prism sheet unit comprises two prism sheets each having on one surface thereof a plurality of mutually parallel fine prism rows. The other surface of each prism sheet is a plane surface. The two prism sheets are stacked so that the prism rows of one of the two prism sheets and those of the other intersect each other at a predetermined angle in plan view.

With the above-described arrangement, incident light from a plurality of light sources can be combined together by a thin optical system comprising a prism sheet unit formed by stacking two prism sheets. Therefore, it is possible to provide a light source apparatus that is small and thin in shape and optically superior in light combining performance.

In the above-described light source apparatus, the light sources may emit different colors of light, respectively and the exiting light may be color-mixed light.

With the above-described arrangement, incident light from a plurality of light sources emitting different colors of light can be color-mixed together by a thin optical system comprising a prism sheet unit. Therefore, it is possible to provide a light source apparatus that is small and thin in shape and optically superior in color-mixing performance.

In the light source apparatus of the present invention, the prism sheet unit comprises a single prism sheet having a plurality of mutually parallel fine prism rows formed on each of two opposite surfaces thereof so that the prism rows on one of the two opposite surfaces and those on the other intersect each other at a predetermined angle in plan view.

With the above-described arrangement, incident light from a plurality of light sources can be combined together by a single prism sheet. When two linear prisms are used to combine together incident light, a space for arrangement is needed between the linear prisms. In the light source apparatus of the present invention, such a space is unnecessary, and hence a thin optical system can be formed. In addition, combining of light is realized by a single sheet member without using a costly member. Therefore, the component cost is reduced, and thus it is possible to provide a light source apparatus that is small and thin in shape and less costly.

In the above-described light source apparatus, the light sources may emit different colors of light, respectively and the exiting light may be color-mixed light.

With the above-described arrangement, incident light from a plurality of light sources emitting different colors of light can be color-mixed together by a thin optical system comprising a prism sheet unit. Therefore, it is possible to provide a light source apparatus that is small and thin in shape and optically superior in color-mixing performance.

The light sources are disposed for four zones defined by intersection of the prism rows on the two prism surfaces of the prism sheet unit.

Incident lights from the light sources are applied along near center lines passing through the centers of the cross angles of the prism rows on the two prism surfaces of the prism sheet unit.

The light sources are disposed so that the lights emitted from the light sources are directed toward a predetermined converging point of the prism sheet unit.

The light sources are disposed in points symmetry with respect to the predetermined converging point on the prism sheet unit.

The light sources are disposed in line symmetry with respect to an axis that passes through the predetermined converging point on the prism sheet unit.

With the above-described arrangement, the light sources are dispersedly disposed for four zones formed by intersection of the prism rows on the two prism surfaces of the prism sheet unit, and the incident lights from the light sources are applied along near center lines passing through the centers of the cross angles of the prism rows. Further, all the incident lights from the light sources are applied toward a predetermined converging point on the prism sheet unit. With this method of applying incident light from a plurality of light sources, which is characteristic of the present invention, the prism sheet unit is allowed to perform its light-combining function even more efficiently.

The prism rows on the two prism surfaces of the prism sheet unit have the same apex angle, which is approximately 90°.

The prism rows have a pitch of 1 μm to 100 μm.

The prism rows preferably have a fine pitch in the range of 1 μm to 100 μm as stated above because with this arrangement a plurality of light beams emitted from the surfaces of the fine prism rows can be visually recognized as a single beam of combined exiting light.

The light source apparatus has an optical element (lens) for collecting light in front of a light-emitting surface of each of the light sources.

The optical element is a lens having different radii of curvature in the longitudinal and transverse directions thereof.

With the above-described arrangement, the incident light can be collimated into parallel rays. In addition, the expansion of the beam width of exiting light due to oblique incidence of the incident light can be suppressed by using the lens having different radii of curvature in the longitudinal and transverse directions thereof.

The light sources include red, green and blue light-emitting diode light sources.

The red, green and blue light-emitting diode light sources are disposed for three of four zones formed by intersection of the prism rows on the two prism surfaces of the prism sheet unit, respectively, and a green light-emitting diode light source is disposed for the remaining one of the four zones.

The red, green and blue light-emitting diode light sources are disposed for three of four zones formed by intersection of the prism rows on the two prism surfaces of the prism sheet unit, respectively, and a blue YAG light-emitting diode light source is disposed for the remaining one of the four zones.

With the above-described arrangement, the number of green light-emitting diode light sources is increased in the light source apparatus to emit white light by color mixing of light from red, green and blue light-emitting diode light sources. The reason for this is as follows. The green light-emitting diode light source emits a smaller amount of light than each of the red and blue light-emitting diode light sources. Therefore, the number of green light-emitting diode light sources used is increased to emit white light of good color balance.

Thus, the light source apparatus of the present invention can combine together incident light from a plurality of light sources by a thin optical system comprising a prism sheet unit. Therefore, it is possible to provide a light source apparatus that is small and thin in shape and optically superior in light combining performance.

BRIEF DESCRIPTION OF THE DRAWINGS

FIG. 1 is a perspective view of a light source apparatus according to a first embodiment of the present invention.

FIG. 2 is a diagram including top and side views showing the arrangement of two prism sheets in FIG. 1.

FIG. 3 is a plan view showing the relationship between the two prism sheets and a plurality of light sources in FIG. 2.

FIG. 4 is an enlarged view of a part of the prism sheet PS2 shown in FIG. 2.

FIG. 5 is an enlarged view of a part of the prism sheet PS1 shown in FIG. 2.

FIG. 6 is a perspective view schematically showing an optical path along which incident light passes through the two prism sheets shown in FIG. 2.

FIG. 7 is a side view showing the expansion of light beams when incident light is obliquely incident on a prism sheet in the present invention.

FIG. 8 is a plan view of light beams incident on the prism sheet shown in FIG. 7 from four light sources.

FIG. 9 is a side view showing the expansion of light beams when incident light is obliquely incident on a prism sheet in a light source apparatus according to a second embodiment of the present invention.

FIGS. 10a and 10b are plan views of incident light on the prism sheet shown in FIG. 9.

FIG. 11 is a plan view of light beams incident on the prism sheet shown in FIG. 9 from four light sources.

FIG. 12 is a perspective view of a light source apparatus according to a third embodiment of the present invention.

FIG. 13 is a sectional view of a blue YAG LED shown in FIG. 12.

FIG. 14 is a perspective view of a light source apparatus according to a fourth embodiment of the present invention.

FIG. 15 is a diagram including top and side views showing the arrangement of a prism sheet in FIG. 14.

FIG. 16 is a plan view showing the relationship between the prism sheet and a plurality of light sources in FIG. 15.

FIG. 17 is an enlarged view of a part of the prism sheet shown in FIG. 15.

FIG. 18 is an enlarged view of another part of the prism sheet shown in FIG. 15.

FIG. 19 is a diagram including top and side views showing optical paths along which incident light passes through the prism sheet shown in FIG. 15.

FIG. 20 is a perspective view schematically showing an optical path along which incident light passes through the prism sheet shown in FIG. 15.

FIG. 21 is a side view showing the expansion of light beams when incident light is obliquely incident on a prism sheet in the present invention.

FIG. 22 is a plan view of beams incident on the prism sheet shown in FIG. 21 from four light sources.

FIG. 23 is a side view showing the expansion of light beams when incident light is obliquely incident on a prism sheet in a light source apparatus according to a fifth embodiment of the present invention.

FIGS. 24a and 24b are plan views of incident light on the prism sheet shown in FIG. 23.

FIG. 25 is a plan view of light beams incident on the prism sheet shown in FIG. 23 from four light sources.

FIG. 26 is a perspective view of a light source apparatus according to a sixth embodiment of the present invention.

FIG. 27 is a sectional view of a white LED shown in FIG. 26.

FIG. 28 is a schematic view showing the arrangement of a conventional color projector.

FIG. 29 is a fragmentary sectional view of a linear prism plate shown in FIG. 28.

FIG. 30 is an exploded perspective view of a conventional planar light-emitting apparatus.

FIG. 31 is an enlarged side view of a part of a light-emitting substrate shown in FIG. 30.

DETAILED DESCRIPTION OF THE PREFERRED EMBODIMENTS

Embodiments of the present invention will be explained below in detail with reference to the accompanying drawings. FIGS. 1 to 8 show a light source apparatus according to a first embodiment of the present invention. FIG. 1 is a perspective view of the light source apparatus. FIG. 2 is a diagram including top and side views showing the arrangement of two prism sheets. FIG. 3 is a plan view showing the relationship between the two prism sheets and a plurality of light sources.

First, light source apparatus according to first to third embodiments that use a prism sheet unit PSU comprising a stack of two prism sheets will be explained.

In FIG. 1, a light source apparatus 10 includes a prism sheet unit PSU comprising a stack of two prism sheets PS1 and PS2 and four light sources K1, K2, K3 and K4 disposed underneath the stacked prism sheets PS1 and PS2 at a tilt of a predetermined angle. The light sources K1 to K4 comprise LEDs 1g, 1r and 1b, condenser lenses 2, and casings 3 housing the LEDs 1g, 1r and 1b and the condenser lenses 2, respectively. In the first embodiment, a red LED 1r (hereinafter referred to as "R LED") is used as the LED of the light source K1. A blue LED 1b (hereinafter referred to as "B LED") is used as the LED of the light source K4. A green LED 1g (hereinafter referred to as "G LED") is used as each of the LEDs of the light sources K2 and K3.

In the light source apparatus 10, red light (hereinafter referred to as "R light") emitted from the light source K1, blue light (hereinafter referred to as "B light") emitted from the light source K4 and two green light (hereinafter referred to as "G light") emitted from the light sources K2 and K3 are input to the prism sheet unit PSU from the lower side of the prism sheet PS1 and color-mixed together through the two prism sheets PS1 and PS2, thereby combining together R light, G light and B light into single white light Pw, which is then emitted from the exit surface of the prism sheet PS2 in a direction perpendicular thereto.

Next, the positional relationship between the prism sheet unit PSU comprising the two prism sheets PS1 and PS2 and the four light sources K1, K2, K3 and K4 will be explained with reference to FIGS. 2 and 3. FIG. 2 is a diagram including top and side views showing the arrangement of the two prism sheets PS1 and PS2. FIG. 2 shows a top view of the stacked two prism sheets PS1 and PS2 in the center thereof, a side view of the prism sheets PS1 and PS2 as seen from an X axis direction on the left side thereof, and a side view of the prism sheets PS1 and PS2 as seen from a Y axis direction on the lower side thereof. FIG. 3 shows the positional relationship of the four light sources K1, K2, K3 and K4 to the top view of the stacked prism sheets PS1 and PS2 shown in FIG. 2.

As shown in FIG. 2, the prism sheets PS1 and PS2 each have a prism surface having a plurality of mutually parallel fine prism rows. The prism sheets PS1 and PS2 are stacked in such a manner that the prism sheet PS1 is underneath the prism sheet PS2 and that the respective prism rows intersect each other at a predetermined angle in plan view and further that the prism surfaces of the prism sheets PS1 and PS2 are parallel to each other. In this embodiment, the prism sheets PS1 and PS2 each have an upper surface serving as a prism surface and a lower surface formed as a plane surface. The prism rows of the prism sheets PS1 and PS2 have the same apex angle, which is approximately 90°. The prism sheets PS1 and PS2 are stacked so that the respective prism rows intersect each other at right angles in plan view. Accordingly, the solid lines parallel to the X axis in the top view of the prism sheets PS1 and PS2 show the peaks and valleys of the prism rows of the upper prism sheet PS2, and the dashed lines parallel to the Y axis show the peaks and valleys of the prism rows of the lower prism sheet PS1. The solid lines and the dashed lines form orthogonal cells. The prism rows of the prism sheets PS1 and PS2 have a fine pitch of 1 μm to 100 μm.

The following is an explanation of the positional relationship between the two prism sheets PS1 and PS2 and the four light sources K1, K2, K3 and K4. As shown in FIG. 3, those of the prism rows on the stacked two prism sheets PS1 and PS2 that pass through the center points of the prism sheets PS1 and PS2 intersect each other in plan view to form four zones on the plane of the stacked two prism sheets PS1 and PS2. That is, the plane of the prism sheets PS1 and PS2 is divided by the X axis and the Y axis to form four zones S1, S2, S3 and S4. The four light sources K1, K2, K3 and K4 are respectively disposed for the four zones S1, S2, S3 and S4. Accordingly, incident light P1, P2, P3 and P4 emitted from the light sources K1, K2, K3 and K4 are applied along center lines N and M passing through the centers of the cross angles of the prism rows on the two stacked prism sheets PS1 and PS2, respectively. Further, the incident light P1, P2, P3 and P4 are convergently applied toward a predetermined converging point Po on the two stacked prism sheets PS1 and PS2. In this embodiment, the predetermined converging point Po on the two stacked prism sheets PS1 and PS2 is the center point on the upper side of the upper prism sheet PS2.

Consequently, the positional relationship between the light sources is as follows. As shown in FIG. 3, the light source K1 and the light source K4 are positioned in points symmetry with respect to the converging point Po, and so are the light source K2 and the light source K3. The light source K1 and the light source K3 are positioned in line symmetry with respect to the X axis that passes through the converging point Po, and so are the light source K2 and the light source K4. The angle of each of the light sources K1, K2, K3 and K4 from the X axis is the same. This angle is determined by the refractive index of the constituent material of the two prism sheets PS1 and PS2 and the prism apex angle. In this embodiment, an acrylic resin (PMMA) having a refractive index n of 1.49 is used as the material of the two prism sheets PS1 and PS2, and the prism apex angle is 90°. Therefore, the light sources K1, K2, K3 and K4 are all positioned at the same angle of 43.5° from the X axis. The reason for this is as follows. The prism angle has plus and minus values, and hence there are four different directions of beams depending on the surfaces on which the beams are incident. However, the four directions are the same from the viewpoint of the angle relative to the normal to each surface. In other words, although the directions of beams differ from each other, the incidence angles are the same. To allow exiting light to be emitted directly upward under the condition that the refractive index n of the two prism sheets PS1 and PS2 is 1.49 and the prism apex angle is 90°, the incidence directions of the incident light P1, P2, P3 and P4 are at the same angle of ±43.5° with respect to the X axis.

Incidence conditions of light applied from each light source to the two stacked prism sheets PS1 and PS2 in the present invention will be detailed later. The basic light-combining (color mixing) operation will be explained below with reference to FIG. 2. A "Z" axis is defined by the direction of exiting light relative to the X-Y plane of the two prism sheets PS1 and PS2, i.e. a direction perpendicular to the X-Y plane. One prism inclined surface constituting the prism surface of the prism sheet PS1 is denoted by L1, and the other prism inclined surface by L2. One prism inclined surface constituting the prism surface of the prism sheet PS2 is denoted by U1, and the other prism inclined surface by U2. The light sources K1, K2, K3 and K4 are disposed underneath the prism sheet PS1 at a tilt of a predetermined angle and positioned at an angle of 43.5° from the X axis, as has been stated above.

Incident light from each light source positioned as stated above is applied to the prism surface as an oblique incidence with respect to the X-Y plane and also at an oblique incidence to the Z axis. That is, the light source apparatus 10 of the present invention makes incident light from each light source obliquely incident on the prism surface and uses the prism surface diagonally, thereby allowing incident light applied from four different directions to be emitted with refraction under the same conditions. Regarding each incident light, as shown in FIG. 2, incident light P1 emitted from the light source K1 passes through the prism inclined surface L1 of the prism sheet PS1 and the prism inclined surface U2 of the prism sheet PS2 to become exiting light. Similarly, incident light P2 emitted from the light source K2 passes through the prism inclined surface L2 of the prism sheet PS1 and the prism inclined surface U2 of the prism sheet PS2 to become exiting light. Incident light P3 emitted from the light source K3 passes through the prism inclined surface L1 of the prism sheet PS1 and the prism inclined surface U1 of the prism sheet PS2 to become exiting light. Incident light P4 emitted from the light source K4 passes through the prism inclined surface L2 of the prism sheet PS1 and the prism inclined surface U1 of the prism sheet PS2 to become exiting light.

Incident light with a wide area that is emitted from each light source is incident on the inclined surfaces of a multiplicity of prism rows disposed on the two prism sheets PS1 and PS2 to emit with refraction. In this regard, the prism rows are arranged at a fine pitch of 1 µm to 100 µm, as has been stated above. Therefore, the light P1, P2, P3 and P4 as emitted from the two stacked prism sheets PS1 and PS2 are not visually recognized as discrete exiting light but as combined single exiting light. Accordingly, if the light source K1 emits R light and the light source K4 emits B light and further the light sources K2 and K3 emit G light, then the R light, B light and G light are mixed together, and white light Pw is emitted as exiting light.

Next, the optical path of incident light from each light source that is applied to the two prism sheets PS1 and PS2 will be explained. FIG. 4 is an enlarged view of a part of the prism sheet PS2 shown in FIG. 2, illustrating the optical path of each incident light passing through the prism sheet PS2 while being refracted. FIG. 5 is an enlarged view of a part of the prism sheet PS1 shown in FIG. 2, illustrating the optical path of each incident light passing through the prism sheet PS1 while being refracted. In this embodiment, an acrylic resin having a refractive index of 1.49 is used as the material of the two prism sheets PS1 and PS2, and the prism apex angle is 90°.

To obtain an optical path through a prism, the following method is generally used: In a case where incident light is made to enter a single prism sheet from a lower side thereof to obtain exiting light emitted directly upward from the prism sheet, light rays are traced backward to obtain the optical path. For example, in the case of the upper prism sheet PS2 shown in FIG. 4, color-mixed white light Pw needs to be emitted directly upward as exiting light. Therefore, exiting light from each light source is made to enter the prism sheet PS2, which is made of an acrylic resin, from directly above the prism sheet PS2 to trace the rays backward. At this time, the incident light travels through the prism sheet PS2 after being given a predetermined angle of refraction according to Snell's law at the interface between the air and the acrylic resin due to the difference in refractive index therebetween. When exiting into the air from the lower surface of the prism sheet PS2, the light is also given a predetermined refraction angle according to Snell's law at the interface between the acrylic resin and the air.

To use the prism sheet PS2 in an actual light source apparatus, incident light from each light source is made incident on the lower surface of the prism sheet PS2 at an angle equal to the angle of light exiting into the air from the prism sheet lower surface in the above-described backward ray tracing. If light is made incident on the lower surface of the prism sheet PS2 at this angle, the incident light travels through the prism sheet PS2 at a predetermined angle of refraction similar to the refraction angle confirmed by the above-described method. Therefore, it is possible to obtain exiting light emitted directly upward from the upper surface of the prism sheet PS2.

Next, the actual optical path of incident light from each light source applied to the two stacked prism sheets PS1 and PS2 will be explained with reference to FIGS. 4 and 5. In the case of the upper prism sheet PS2 shown in FIG. 4, the Y-Z plane is shown. Incident light P1 from the light source K1 and incident light P2 from the light source K2, which are shown in FIG. 2, pass through the left prism inclined surfaces U2 of the prism sheet PS2 and exit directly upward. Incident light P3 from the light source K3 and incident light P4 from the light source K4 pass through the right prism inclined surfaces U1 of the prism sheet PS2 and exit directly upward. Thus, the direction of incidence of the incident light P1 and P2 on the lower surface of the prism sheet PS2 is leftward oblique, and the incidence direction of the incident light P3 and P4 is rightward oblique. That is, the incidence directions of the incident light P1 and P2 and the incident light P3 and P4 are opposite to each other. However, the travel angles of these incident light are the same.

In other words, the angles $\theta 2$ and $\gamma 2$ of all incident light P1, P2, P3 and P4 relative to the normal (shown by the dashed lines) to the interface of the lower surface of the prism sheet PS2 are the same respectively, and the angles $\beta 2$ and $\alpha 2$ of all exiting light P1, P2, P3 and P4 relative to the normal (shown by the dashed line) to the prism inclined surfaces of the prism sheet PS2 are the same respectively. For the prism sheet PS2 that is formed from an acrylic resin having a refractive index of 1.49 and that has a prism apex angle of 90°, the above-described angles are as follows: $\alpha 2=45.0°$; $\beta 2=28.3°$; $\gamma 2=16.7°$; and $\theta 2=25.3°$.

In the case of the lower prism sheet PS1 shown in FIG. 5, the X-Z plane is shown. The angles $\theta 1$ and $\gamma 1$ of all incident light P1, P2, P3 and P4 relative to the normal (shown by the dashed lines) to the interface of the lower surface of the prism sheet PS1 are the same respectively, and the angles β1 and α1 of all exiting light P1, P2, P3 and P4 relative to the normal (shown by the dashed line) to the prism inclined surfaces of the prism sheet PS1 are the same respectively. For the prism sheet PS1 that is formed from an acrylic resin having a refractive index of 1.49 and that has a prism apex angle of 90°, the above-described angles are as follows: α1=50.30; β1=31.1°; γ1=24.6°; and θ1=38.4°. Although the exiting light P1 to P4 from the prism sheet PS1 in FIG. 5 are shown to be emitted directly upward for the sake of drawing, it should be noted that these exiting light have an angle of inclination relative to a direction perpendicular to the plane of FIG. 5. That is, the direction of inclination is invisible in FIG. 5, which shows the X-Z plane. In actuality, the exiting light P1 and P2 have an angle of inclination to the back of the plane of FIG. 5, and the exiting light P3 and P4 have an angle of inclination to the front of the plane of FIG. 5.

That is, the directions of inclination of the exiting light P1 and P2 and the exiting light P3 and P4 are opposite to each other, but the angles of inclination thereof are the same, i.e. 25.3° relative to the Z axis. This angle of inclination is 50.3° with respect to the normal to the interface of each prism inclined surface of the prism sheet PS1. Accordingly, the exiting light P1 to P4 from the lower prism sheet PS1 that have an inclination of 25.3° relative to the Z axis are incident on the lower surface of the upper prism sheet PS2 at an incidence angle of 25.3° relative to the normal to the interface of the prism sheet lower surface. That is, the exiting light P1 to P4 become incident light having the incidence angle θ2. The incident light P1, P2, P3 and P4 travel through the prism sheet PS2 while being refracted to exit directly upward from the upper surface of the prism sheet PS2. It should be noted that FIGS. 4 and 5 show the way in which the incident light P1 and P2 (P3 and P4) are incident on different prism inclined surfaces for the sake of easy understanding. In actuality, the incident light P1 and P2 (P3 and P4) are also incident on the same prism inclined surfaces simultaneously and combined together.

FIG. 6 is a perspective view schematically showing an optical path along which incident light passes successively through the two prism sheets PS1 and PS2. In FIG. 6, only incident light P1 is shown as a representative example. When incident light P1 enters the prism sheet PS1 from the lower surface thereof so as to be incident on the prism rows at an angle of 43.5° relative to the X-Y plane direction from the X axis and at an angle (θ1) of 38.4° relative to the Z axis direction from the normal to the interface of the prism sheet lower surface, the light exits into the air from the prism inclined surface L1 after being refracted in the prism sheet PS1. The incident light P1 exiting the prism sheet PS1 enters the upper prism sheet PS2 from the lower surface thereof at an angle (θ2) of 25.3° in the Z axis direction from the normal to the interface of the prism sheet lower surface. The light is refracted in the prism sheet PS2 and emitted into the air directly upward from the prism inclined surface U2. Similarly, incident light P2, P3 and P4 (not shown in FIG. 6) travel and exit along the optical paths shown in FIGS. 4 and 5. It should be noted that in FIG. 6 the two prism sheets PS1 and PS2 are shown to be slightly more away from each other than actuality for the sake of easy understanding. In addition, an X' axis corresponding to the X axis is disposed as a hypothetical axis for easy understanding of the position of the prism sheet PS2 relative to the prism sheet PS1.

Thus, in the present invention, two prism sheets are stacked with their prism rows intersecting each other, and incident light is made incident on the prism rows from an oblique direction having a predetermined angle relative to the X-Y plane direction and a predetermined angle relative to the Z axis direction, thereby using the prism inclined surfaces diagonally. As a result, incident light from four different directions can be made to enter the two stacked prism sheets simultaneously under the same optical conditions to combine them together.

Next, the expansion of light beams in the light source apparatus of the present invention will be explained. FIG. 7 is a side view showing the expansion of light beams when incident light P1 and P4 are incident on the lower surface of the lower prism sheet PS1. When the light source apparatus is used as an illumination apparatus, the optical axis of exiting light from the illumination apparatus is in a direction parallel to the Z axis, and the optical axis of incident light from each of the light sources K1 and K4 is in a direction inclined from the Z axis at the angle θ1 (38.4°). The horizontal axis is an axis rotated through 43.5° from the X axis of the prism sheet PS1. Let us consider a case where incident light P1 having a beam width H from the light source K1 is incident on the lower surface of the prism sheet PS1. In this case, because a light beam having a width is made incident on a horizontal plane from an oblique direction, the width of the beam expands on the plane of incidence. Consequently, the incident light P1 exits as a beam having a width of 1.28H. Incident light P4 from the light source K4 is also made incident on the lower surface of the prism sheet PS1 from a position symmetric to the position of the light source K1 under the same optical conditions as the incident light P1 from the light source K1, and the beam of light P4 expands in the same way as the above.

FIG. 8 is a plan view showing the expansion of light beams when incident light P1 to P4 are made incident on the two stacked prism sheets PS1 and PS2 from four directions by the four light sources K1 to K4 in the light source apparatus shown in FIG. 7. In FIG. 8, the dashed lines show axes rotated through 43.5° from the X axis. Reference symbol S14 denotes illuminating light formed from lights from the light sources K1 and K4. Reference symbol S23 denotes illuminating light formed from lights from the light sources K2 and K3. Each illuminating light has an elliptical sectional shape having a minor diameter equal to the width H of the incident light and a major diameter equal to the width 1.28H of the exiting light. The two elliptic illuminating light S14 and S23 are superimposed on one another with their center points aligned with each other. As a result, the overlapping portions of the two ellipses, shown by the oblique lines, can be utilized as illuminating light S synthesized from the incident light P1 to P4 from the four light sources K1 to K4. That is, if light emitted from the four light sources K1, K2, K3 and K4 are R light, B light, G light and G light, illuminating light S can be utilized as color-mixed white light Pw.

Next, a light source apparatus according to a second embodiment of the present invention will be explained with reference to FIGS. 9 to 11. FIG. 9 is a side view showing the expansion of light beams when incident light P1 and P4 from the light sources K1 and K4 are incident on the lower surface of the lower prism sheet PS1, which corresponds to FIG. 7 showing the light source apparatus of the first embodiment. Accordingly, the same constituent elements as those of the light source apparatus shown in FIG. 7 are denoted by the same reference numerals, and redundant explanation is omitted. The light source apparatus shown in FIG. 9 differs from the light source apparatus in FIG. 7 in that lenses each having different radii of curvature in the longitudinal and transverse directions thereof are disposed as optical devices in the respective optical paths between the light sources K1 and K4 and the lower surface of the prism sheet PS1. In this embodiment, anamorphic lenses 12 are disposed as the optical devices.

Next, the way in which light beams expand will be explained with reference to FIGS. 9, 10a and 10b. Let us consider a case where incident light P1 of a circular sectional shape having a diameter H as shown in FIG. 10a is emitted from the light source K1. By passing through the anamorphic lens 12, the incident light P1 is subjected to different optical changes in the longitudinal and transverse directions thereof. Consequently, the incident light P1 is formed into a beam having an elliptical sectional shape as shown in FIG. 10b, which has a major diameter H in the transverse direction and a minor diameter Hs in the longitudinal direction, and this elliptical incident light P1 is incident on the lower surface of the lower prism sheet PS1. Because the incident light P1 is applied to a horizontal plane from an oblique direction, the beam width in the longitudinal direction expands on the plane of incidence, resulting in the longitudinal beam width expanding from Hs to H. Thus, the light is restored to a beam of a circular sectional shape having a diameter H, as shown in FIG. 10a, and the restored light is allowed to exit. In other words, the beam width of the incident light P1 is contracted in advance by an amount corresponding to the amount of expansion due to the oblique incidence by using the anamorphic lens 12, thereby obtaining exiting light having the same sectional shape as that of the incident light.

FIG. 11 is a plan view showing the expansion of beams when incident light is made incident on the two stacked prism sheets PS1 and PS2 from four directions by the four light sources K1, K2, K3 and K4 in the light source apparatus having the anamorphic lenses 12 shown in FIG. 9. FIG. 11 corresponds to FIG. 8 showing the light source apparatus of the first embodiment. FIG. 11 differs from FIG. 8 as follows. In FIG. 11, both illuminating light S14 formed from lights from the light sources K1 and K4 and illuminating light S23 formed from lights from the light sources K2 and K3 have a circular sectional shape of a diameter H, and hence illuminating light S obtained by superimposition of the illuminating light S14 and S23 also has a circular sectional shape of a diameter H. Accordingly, all the illuminating light S14, S23 and S become a single beam of a circular sectional shape shown by the oblique lines. That is, the light source apparatus of the second embodiment can utilize all the incident light as illuminating light and hence can serve as an efficient illumination apparatus. It should be noted that the light source apparatus shown in FIG. 9 has an arrangement in which the anamorphic lenses 12 are disposed in the optical paths of the light source apparatus according to the first embodiment shown in FIG. 7. The arrangement, however, is not necessarily limited to the illustrated one. An anamorphic lens 12 may be disposed in place of the condenser lens 2 disposed in each light source K.

Next, a light source apparatus according to a third embodiment of the present invention will be explained with reference to FIGS. 12 and 13. FIG. 12 is a perspective view of a light source apparatus 20 according to the third embodiment. The basic arrangement of the light source apparatus 20 is the same as that of the light source apparatus 10 of the first embodiment shown in FIG. 1. Therefore, the same constituent elements as those of the light source apparatus 10 shown in FIG. 1 are denoted by the same reference numerals, and redundant explanation is omitted. The light source apparatus 20 shown in FIG. 12 differs from the light source apparatus 10 shown in FIG. 1 in that a blue YAG LED 1by is disposed as a light-emitting device of the light source K3 in place of the G LED.

The arrangement of the blue YAG LED 1by will be explained below. FIG. 13 is a sectional view of the blue YAG LED 1by that is a fluorescent color-mixing type white light-emitting device. The blue YAG LED 1by has a B LED 1b connected to a substrate 33 having electrodes 31 and 32. The B LED 1b is molded with a transparent resin 36 mixed with YAG fluorescent particles 35.

The blue YAG LED 1by operates as follows. When a driving voltage is applied between the electrodes 31 and 32, the B LED 1b emits blue light Pb. When the blue light Pb collides with the fluorescent particles 35 mixed in the transparent resin 36, the fluorescent particles 35 are excited to cause wavelength conversion, and thus yellow light Pe is emitted from the fluorescent particles 35 as shown in the figure. As a result, the blue YAG LED 1by emits fluorescent white light Pwy that is a mixture of blue light Pb emitted from the B LED 1b and output without colliding with the fluorescent particles 35 and yellow light Pe obtained through wavelength conversion of the blue light Pb by colliding with the fluorescent particles 35.

As shown in FIG. 12, the light source apparatus 20 uses an R LED 1r in the light source K1, a G LED 1g in the light source K2, a blue YAG LED 1by in the light source K3 and a B LED 1b in the light source K4 to perform color mixing. Therefore, color-mixed light obtained from the R, G and B LEDs is additionally mixed with fluorescent white light Pwy from the blue YAG LED 1by. Thus, an illumination apparatus that is bright and superior in color rendering properties can be realized.

Although in the foregoing first to third embodiments light from four light sources are combined together, there is no particular restriction on the number of light sources used. The present invention is also applicable to a collective light source apparatus that combines together light from light sources of the same wavelength.

According to the foregoing embodiments, incident light from a plurality of light sources can be combined together by a thin optical system comprising a prism sheet unit formed by stacking two prism sheets. Therefore, it is possible to provide a light source apparatus that is small and thin in shape and optically superior in light combining performance.

The following is an explanation of light source apparatus according to fourth to sixth embodiments that have a plurality of light sources and a prism sheet unit PSU comprising a single prism sheet PS having a plurality of mutually parallel fine prism rows formed on two opposite surfaces thereof so that the prism rows on the two opposite surfaces intersect each other at a predetermined angle. The light sources are disposed at the light entrance surface side of the prism sheet unit PSU at a tilt of a predetermined angle.

That the light sources are disposed at a tilt of a predetermined angle means to position the light sources so that when incident lights from the light sources entering the prism sheet unit from the light entrance surface side thereof at a predetermined angle is output from the exit surface side of the prism sheet unit as combined exiting light, the rays of the exiting light are emitted in the same direction, e.g. directly upward. That is, the light sources are disposed so that light emitted therefrom are directed toward a predetermined converging point on the prism sheet unit. Similarly, the prism rows are arranged to intersect each other at a predetermined angle so that light emitted from the light sources are combined together by the prism sheet unit and emitted in the same direction. These conditions are determined, for example, by the refractive index of the prism sheet unit, the prism configuration, the prism apex angle, etc.

Fourth to sixth embodiments of the present invention will be explained below in detail with reference to the accompanying drawings. FIGS. 14 to 20 show a light source apparatus according to a fourth embodiment of the present invention. FIG. 14 is a perspective view of the light source apparatus. FIG. 15 is a diagram including top and side views showing the arrangement of a prism sheet. FIG. 16 is a plan view showing the relationship between the prism sheet and a plurality of light sources. In FIG. 14, a light source apparatus 10 includes a prism sheet unit PSU comprising a single prism sheet PS and four light sources K1, K2, K3 and K4 disposed underneath the prism sheet PS at a tilt of a predetermined angle. Each light source K comprises an LED 1, a condenser lens 2, and a casing 3 housing the LED 1 and the condenser lens 2. In this embodiment, a red LED 1r (hereinafter referred to as "R LED") is used as the LED of the light source K1. A blue LED 1b (hereinafter referred to as "B LED") is used as the LED of the light source K4. A green LED 1g (hereinafter referred to as "G LED") is used as each of the LEDs of the light sources K2 and K3.

In the light source apparatus 10, red light (hereinafter referred to as "R light") emitted from the light source K1, blue light (hereinafter referred to as "B light") emitted from the light source K4 and two green light (hereinafter referred to as "G light") emitted from the light sources K2 and K3 are input to the prism sheet PS from the lower side thereof and color-mixed together through the prism sheet PS, thereby combining together R light, G light and B light into single white light Pw, which is then emitted from the exit surface of the prism sheet PS in a direction perpendicular thereto.

Next, the positional relationship between the prism sheet PS and the four light sources K1, K2, K3 and K4 will be explained with reference to FIGS. 15 and 16. FIG. 15 is a diagram including top and side views showing the arrangement of the prism sheet PS. FIG. 15 shows a top view of the prism sheet PS in the center thereof, a side view of the prism sheet PS as seen from an X axis direction on the left side thereof, and a side view of the prism sheet PS as seen from a Y axis direction on the lower side thereof. FIG. 16 shows the positional relationship of the four light sources K1, K2, K3 and K4 to the top view of the prism sheet PS shown in FIG. 15.

As shown in FIG. 15, the prism sheet PS has upper and lower surfaces serving as prism surfaces each having a plurality of mutually parallel fine prism rows. The prism rows on the two prism surfaces intersect each other at a predetermined angle in plan view. In the figure, the prism rows on the lower prism surface are denoted by PS1, and the prism rows on the upper prism surface are denoted by PS2. In this embodiment, the prism rows PS1 and PS2 have an apex angle of 60° and are arranged to intersect each other at right angles. Accordingly, the solid lines parallel to the Y axis in the top view of the prism sheet PS show the peaks and valleys of the upper prism rows PS2, and the dashed lines parallel to the X axis show the peaks and valleys of the lower prism rows PS1. The solid lines and the dashed lines form orthogonal cells. The prism rows PS1 and PS2 have a fine pitch of 1 μm to 100 μm.

The following is an explanation of the positional relationship between the prism sheet PS and the four light sources K1, K2, K3 and K4. As shown in FIG. 16, the four light sources K1, K2, K3 and K4 are dispersedly disposed for four zones divided by intersection of the prism rows formed on the upper and lower surfaces of the prism sheet PS, i.e. four zones S1, S2, S3 and S4 defined by dividing the plane of the prism sheet PS by the X axis and the Y axis. Accordingly, incident light P1, P2, P3 and P4 emitted from the light source K1, K2, K3 and K4, respectively, are applied along center lines N and M passing through the centers of the cross angles of the prism rows on the prism sheet PS. Further, the incident light P1, P2, P3 and P4 are convergently applied toward a predetermined converging point Po on the prism sheet PS. In this embodiment, the predetermined converging point Po on the prism sheet PS is the center point on the upper side of the upper prism rows PS2.

Consequently, the positional relationship between the light sources is as follows. As shown in FIG. 16, the light source K1 and the light source K4 are positioned in point symmetry with respect to the converging point Po, and so are the light source K2 and the light source K3. The light source K1 and the light source K3 are positioned in line symmetry with respect to the X axis that passes through the converging point Po, and so are the light source K2 and the light source K4. The angle of each of the light sources K1, K2, K3 and K4 from the X axis is the same. This angle is determined by the refractive index of the constituent material of the prism sheet PS and the prism apex angle. In this embodiment, an acrylic resin (PMMA) having a refractive index n of 1.49 is used as the material of the prism sheet PS, and the prism apex angle of both the prism rows PS1 and PS2 is 60°. Therefore, the light sources K1, K2, K3 and K4 are all positioned at the same angle of 47.8° from the X axis. The reason for this is as follows. The prism angle has plus and minus values, and hence there are four different directions of beams depending on the surfaces on which the beams are incident. However, the four directions are the same from the viewpoint of the angle relative to the normal to each surface. In other words, although the directions of beams differ from each other, the incidence angles are the same. To allow exiting light to be emitted directly upward under the condition that the refractive index n of the prism sheet PS is 1.49 and the prism apex angle is 60°, the incidence directions of the incident light P1, P2, P3 and P4 are at the same angle of ±47.8° with respect to the X axis.

Incidence conditions of light applied from each light source to the prism sheet PS in the present invention will be detailed later. The basic light-combining (color mixing) operation will be explained below with reference to FIG. 15. A "Z" axis is defined by the direction of exiting light relative to the X-Y plane of the prism sheet PS, i.e. a direction perpendicular to the X-Y plane. One prism inclined surface constituting the prism surface that forms the prism rows PS1 is denoted by L1, and the other prism inclined surface by L2. One prism inclined surface constituting the prism surface that forms the prism rows PS2 is denoted by U1, and the other prism inclined surface by U2. The light sources K1, K2, K3 and K4 are disposed underneath the prism rows PS1 at a tilt of a predetermined angle from the Z axis and positioned at an angle of 47.8° from the X axis, as has been stated above.

Incident light from each light source positioned as stated above is applied to the prism surface at an oblique incidence with respect to the X-Y plane and also at an oblique incidence to the Z axis. That is, the light source apparatus 10 of the present invention makes incident light from each light source obliquely incident on the prism surface and uses the prism surface diagonally, thereby allowing incident light applied from four different directions to be emitted with refraction under the same conditions. Regarding each incident light, as shown in FIG. 15, incident light P1 emitted from the light source K1 enters the prism sheet PS through the prism inclined surface L2 of the prism rows PS1 and passes through the prism inclined surface U2 of the prism rows PS2 to become exiting light. Similarly, incident light P2 emitted from the light source K2 enters the prism sheet PS through the prism inclined surface L2 of the prism rows PS1 and passes through the prism inclined surface U1 of the prism rows PS2 to become exiting light. Incident light P3 emitted from the light source K3 enters the prism sheet PS through the prism inclined surface L1 of the prism rows PS1 and passes through the prism inclined surface U2 of the prism rows PS2 to become exiting light. Incident light P4 emitted from the light source K4 enters the prism sheet PS through the prism inclined surface L1 of the prism rows PS1 and passes through the prism inclined surface U1 of the prism rows PS2 to become exiting light.

Incident light with a wide area that is emitted from each light source is incident on the inclined surfaces of a multiplicity of prism rows disposed on the prism sheet PS to emit with refraction. In this regard, the prism rows are arranged at a fine pitch of 1 μm to 100 μm, as has been stated above. Therefore, the light P1, P2, P3 and P4 as emitted from the prism sheet PS are not visually recognized as discrete exiting light but as combined single exiting light. Accordingly, if the light source K1 emits R light and the light source K4 emits B light and further the light sources K2 and K3 emit G light, then the R light, B light and G light are mixed together, and white light Pw is emitted as exiting light.

Next, the optical path of incident light from each light source that is applied to the prism sheet PS will be explained. FIG. 17 is an enlarged view of a part of the prism rows PS2 on the prism sheet PS shown in FIG. 15, illustrating the optical path of each incident light passing through the prism rows PS2 while being refracted. FIG. 18 is an enlarged view of a part of the prism rows PS1 of the prism sheet PS shown in FIG. 15, illustrating the optical path of each incident light passing through the prism rows PS1 while being reflected and refracted. In this embodiment, an acrylic resin having a refractive index of 1.49 is used as the material of the prism sheet PS, and the prism apex angle of both the prism rows PS1 and PS2 is 60°.

To obtain an optical path through a prism, the following method is generally used: In a case where incident light is made to enter a single prism sheet from the lower side thereof to obtain exiting light emitted directly upward from the prism sheet, light rays are traced backward to obtain the optical path. For example, in the case of the upper prism rows PS2 of the prism sheet PS shown in FIG. 17, color-mixed white light Pw needs to be emitted directly upward as exiting light. Therefore, exiting light from each light source is made to enter the prism sheet PS, which is made of an acrylic resin, from directly above the prism sheet PS to trace the rays backward. At this time, the incident light travels through the prism sheet PS after being given a predetermined angle of refraction according to Snell's law at the interface between the air and the acrylic resin due to the difference in refractive index therebetween. When exiting into the air from the lower prism rows PS1 also, the light is given a predetermined refraction angle according to Snell's law at the interface between the acrylic resin and the air.

To use the prism sheet PS in an actual light source apparatus, incident light from each light source is made incident on the prism sheet PS at an angle equal to the angle of light exiting into the air from the prism rows PS1 in the above-described backward ray tracing. If light is made incident on the prism sheet PS at this angle, the incident light travels through the prism sheet PS at a predetermined angle of refraction similar to the refraction angle confirmed by the above-described method. Therefore, it is possible to obtain exiting light emitted directly upward from the prism rows PS2.

Next, the actual optical path of incident light from each light source applied to the two series of prism rows PS1 and PS2 will be explained with reference to FIGS. 17 to 20. In the case of the upper prism rows PS2 shown in FIG. 17, the X-Z plane is shown. Incident light P1 from the light source K1 and incident light P3 from the light source K3, which are shown in FIG. 15, pass through the right prism inclined surfaces U2 of the prism rows PS2 and exit directly upward. Incident light P2 from the light source K2 and incident light P4 from the light source K4 pass through the left prism inclined surfaces U1 of the prism rows PS2 and exit directly upward. Thus, the direction of incidence of the incident light P1 and P3 from the lower side of the prism rows PS2 is rightward oblique, and the incidence direction of the incident light P2 and P4 is leftward oblique. That is, the incidence directions of the incident light P1 and P3 and the incident light P2 and P4 are opposite to each other. However, the travel angles of these incident light are the same.

In other words, the angles β2 and α2 of all incident light P1, P2, P3 and P4 relative to the normal (shown by the dashed line) to the interfaces of the prism inclined surfaces of the prism rows PS2 are the same respectively. For the prism rows PS2 that are formed from an acrylic resin having a refractive index of 1.49 and that have a prism apex angle of 60°, the above-described angles are as follows: β2=35.5°; and α2=60.0°.

In the case of the lower prism rows PS1 shown in FIG. 18, the Y-Z plane is shown. The incident light P1, P2, P3 and P4 enter the prism rows PS1 by being refractively transmitted through the entrance prism inclined surfaces and are totally reflected by the prism inclined surfaces inclined oppositely to the entrance prism inclined surfaces to travel through the prism sheet PS. The angles α1, β1 and of all incident light P1, P2, P3 and P4 relative to the normal (shown by the dashed line) to the interfaces of the prism rows PS1 are the same respectively. For the prism rows PS1 that are formed from an acrylic resin having a refractive index of 1.49 and that have a prism apex angle of 60°, the above-described angles are as follows: α1=38.1°; β1=24.5°; and γ=62.9°. Although the exiting light P1 to P4 from the prism rows PS1 in FIG. 18 are shown to be emitted directly upward for the sake of drawing, it should be noted that these exiting light have an angle of inclination relative to a direction perpendicular to the plane of FIG. 18. That is, the direction of inclination is invisible in FIG. 18, which shows the Y-Z plane. In actuality, the exiting light P1 and P3 have an angle of inclination to the back of the plane of FIG. 18, and the exiting light P2 and P4 have an angle of inclination to the front of the plane of FIG. 18. The angles α1 and β1 in FIG. 18 are also shown to be small angles, but in actuality, these angles have an angle of inclination relative to a direction perpendicular to the plane of FIG. 18.

FIG. 19 is a diagram including top and side views showing optical paths along which incident light passes through the prism sheet PS shown in FIG. 15. FIG. 19 shows a top view of the prism sheet PS in the center thereof, a side view of the prism sheet PS as seen from the X axis direction, shown in FIG. 18, on the left side thereof, and a side view of the prism sheet PS as seen from the Y axis direction, shown in FIG. 17, on the lower side thereof. The solid and dashed lines in the top view of the prism sheet PS respectively show the peaks and valleys of the prism rows in the same way as in FIG. 15. It will be seen from FIG. 19 that beams directed directly upward are only light exiting the prism rows PS2, and it will be possible to understand from the top view and the side views from different directions the inclination and traveling directions of the beams that cannot be shown in FIG. 18 because they have an angle of inclination relative to a direction perpendicular to the plane of FIG. 18. That is, the directions of inclination of the incident light P1, P2, P3 and P4 are different from each other, but the angles of inclination thereof are the same, i.e. 66.8° relative to the Z axis, and 47.8° relative to the X axis in the X-Y plane. This angle of inclination is 38.1° with respect to the normal to the interface of each prism inclined surface of the prism rows PS1. Thus, the incident light P1 to P4 are obliquely incident on the prism sheet PS. The angles of the incident light P1 to P4 relative to the normal to the prism interfaces are as stated above. The incident light P1 to P4 are transmitted through the prism rows PS2 and emitted directly upward from the upper surface of the prism sheet PS. It should be noted that FIGS. 17 to 19 show the way in which the incident light P1 to P4 pass through different prism inclined surfaces and exit directly upward for the sake of easy understanding. In actuality, the incident light P1 to P4 also pass through the same prism inclined surfaces simultaneously and are combined together.

FIG. 20 is a perspective view schematically showing an optical path along which incident light passes successively through the two series of prism rows PS1 and PS2. In FIG. 20, only incident light P1 is shown as a representative example. Incident light P1 traveling toward the prism rows PS1 from the lower side of the two series of prism rows PS1 and PS2 at an angle of 66.8° relative to the Z axis and 47.8° relative to the X axis in the X-Y plane is incident on the prism inclined surface L2 of the prism rows PS1 at an inclination of 38.1° from the normal to the interface (f1). The beam is refracted and travels through the prism sheet PS toward the prism inclined surface L1 at an inclination of 24.5° from the normal to the interface. The beam reaching the prism inclined surface L1 is at an angle of 62.9° from the normal to the interface of the prism inclined surface L1. Thus, the beam reaches the interface at an angle greater than the critical angle and is therefore totally reflected (f2). The totally reflected beam travels through the prism sheet PS toward the prism rows PS2 at an inclination of 62.9° from the normal to the interface, which is the same as that when reaching the interface, and reaches the prism inclined surface U2 of the prism rows PS2 at an inclination of 35.5° from the normal to the interface (f3). The beam is refracted and emitted into the air at an inclination of 60.0° from the normal to the interface, i.e. in a direction parallel to the Z axis and directly upward relative to the X-Y plane. Similarly, incident light P2, P3 and P4 (not shown in FIG. 20) travel and exit along the optical paths shown in FIGS. 17 to 19.

Thus, in this embodiment, the light source apparatus has a prism sheet having prism rows formed on two opposite surfaces thereof so that the prism rows on the two opposite surfaces intersect each other, and incident light is made incident on the prism sheet from an oblique direction having a predetermined angle relative to the X-Y plane direction and a predetermined angle relative to the Z axis direction, thereby using the prism inclined surfaces diagonally. As a result, incident light from four different directions can be made to enter the prism sheet simultaneously under the same optical conditions to combine them together.

Next, the expansion of light beams in the light source apparatus of this embodiment will be explained. FIG. 21 is a side view showing the expansion of light beams when incident light P1 and P4 are incident on the lower surface of the prism sheet PS. When the light source apparatus is used as an illumination apparatus, the optical axis of exiting light from the illumination apparatus is in a direction parallel to the Z axis, and the optical axis of incident light from each of the light sources K1 and K4 is in a direction inclined from the Z axis at an angle θ1 (66.8°). The horizontal axis is an axis rotated through 47.8° from the X axis of the prism sheet PS. Let us consider a case where incident light P1 having a beam width H from the light source K1 is incident on the lower surface of the prism sheet PS. In this case, because a light beam having a width is made incident on a horizontal plane from an oblique direction, the width of the beam expands on the plane of incidence. Consequently, the incident light P1 exits as a beam having a width of 2.5H. Incident light P4 from the light source K4 is also made incident on the lower surface of the prism sheet PS from a position symmetric to the position of the light source K1 under the same optical conditions as the incident light P1 from the light source K1, and the beam of light P4 expands in the same way as the above.

FIG. 22 is a plan view showing the expansion of light beams when incident light P1 to P4 are made incident on the prism sheet PS from four directions by the four light sources K1 to K4 in the light source apparatus shown in FIG. 21. In FIG. 22, the dashed lines show axes rotated through 47.8° from the X axis. Reference symbol S14 denotes illuminating light formed from lights from the light sources K1 and K4. Reference symbol S23 denotes illuminating light formed from lights from the light sources K2 and K3. Each illuminating light has an elliptical sectional shape having a minor diameter equal to the width H of the incident light and a major diameter equal to the width 2.5H of the exiting light. The two elliptic illuminating light S14 and S23 are superimposed on one another with their center points aligned with each other. As a result, the overlapping portions of the two ellipses, shown by the oblique lines, can be utilized as illuminating light S synthesized from the incident light P1 to P4 from the four light sources K1 to K4. That is, if light emitted from the four light sources K1, K2, K3 and K4 are R light, B light, G light and G light, illuminating light S can be utilized as color-mixed white light Pw.

Next, a light source apparatus according to a fifth embodiment of the present invention will be explained with reference to FIGS. 23 and 24. FIG. 23 is a side view showing the expansion of light beams when incident light P1 and P4 from the light sources K1 and K4 are incident on the lower surface of the prism sheet PS, which corresponds to FIG. 21 showing the light source apparatus of the fourth embodiment. Accordingly, the same constituent elements as those of the light source apparatus shown in FIG. 21 are denoted by the same reference numerals, and redundant explanation is omitted. The light source apparatus shown in FIG. 23 differs from the light source apparatus in FIG. 21 in that lenses each having different radii of curvature in the longitudinal and transverse directions thereof are disposed in the respective optical paths between the light sources K1 and K4 and the lower surface of the prism sheet PS. In this embodiment, anamorphic lenses 12 are disposed.

Next, the way in which light beams expand will be explained with reference to FIGS. 23, 24a and 24b. Let us consider a case where incident light P1 of a circular sectional shape having a diameter H as shown in FIG. 24a is emitted from the light source K1. By passing through the anamorphic lens 12, the incident light P1 is subjected to different optical changes in the longitudinal and transverse directions thereof. As a result, the incident light P1 becomes a beam having an elliptical sectional shape as shown in FIG. 24b, which has a major diameter H in the transverse direction and a minor diameter Hs in the longitudinal direction, and this elliptical incident light P1 is incident on the lower surface of the prism sheet PS. Because the incident light P1 is applied to a horizontal plane from an oblique direction, the beam width in the longitudinal direction expands on the plane of incidence, resulting in the longitudinal beam width expanding from Hs to H. Thus, the light is restored to a beam of a circular sectional shape having a diameter H, as shown in FIG. 24a, and the restored light is allowed to exit. In other words, the beam width of the incident light P1 is contracted in advance by an amount corresponding to the amount of expansion due to the oblique incidence by using the anamorphic lens 12, thereby obtaining exiting light having the same sectional shape as that of the incident light.

FIG. 25 is a plan view showing the expansion of beams when incident light is made incident on the prism sheet PS from four directions by the four light sources K1, K2, K3 and K4 in the light source apparatus having the anamorphic lenses 12 shown in FIG. 23. FIG. 25 corresponds to FIG. 22 showing the light source apparatus of the fourth embodiment. FIG. 25 differs from FIG. 22 as follows. In FIG. 25, both illuminating light S14 formed from lights from the light sources K1 and K4 and illuminating light S23 formed from lights from the light sources K2 and K3 have a circular sectional shape of a diameter H, and hence illuminating light S obtained by superimposition of the illuminating light S14 and S23 also has a circular sectional shape of a diameter H. Accordingly, all the illuminating light S14, S23 and S become a single beam of a circular sectional shape shown by the oblique lines. That is, the light source apparatus of the fifth embodiment can utilize all the incident light as illuminating light and hence can serve as an efficient illumination apparatus. It should be noted that the light source apparatus shown in FIG. 23 has an arrangement in which the anamorphic lenses 12 are disposed in the optical paths of the light source apparatus according to the fourth embodiment shown in FIG. 21. The arrangement, however, is not necessarily limited to the illustrated one. An anamorphic lens 12 may be disposed in place of the condenser lens 2 disposed in each light source K.

The amount of expansion of beams in the light source apparatus can be controlled by varying the refractive index and the prism apex angle of the prism sheet PS used in the light source apparatus. The prism sheet PS used in this embodiment is formed from a material having a refractive index of 1.49, and both the upper and lower prism rows have a prism apex angle of 60°. Consequently, the beam width expands 2.5 times. If the apex angle of only the lower prism rows PS1 of the prism sheet PS is changed to 50°, for example, the optical axis of incident light from each light source is in a direction 52.0° inclined from the Z axis, and the amount of expansion of beams decreases to 1.6 times. Thus, the aspect ratio adjusting load on the anamorphic lens 12 can be reduced. In this regard, the prism rows on the prism sheet PS are so fine that it is difficult to visually discern the prism apexes externally. It is preferable to set the same prism apex angle for both the front and back sides of the prism sheet PS so that the prism sheet PS is reversible and easy to handle.

Next, a light source apparatus according to a sixth embodiment of the present invention will be explained with reference to FIGS. 26 and 27. FIG. 26 is a perspective view of a light source apparatus 20 according to the sixth embodiment. The basic arrangement of the light source apparatus 20 is the same as that of the light source apparatus 10 of the fourth embodiment shown in FIG. 14. Therefore, the same constituent elements as those of the light source apparatus 10 shown in FIG. 14 are denoted by the same reference numerals, and redundant explanation is omitted. The light source apparatus 20 shown in FIG. 26 differs from the light source apparatus 10 shown in FIG. 14 in that a white LED 1w is disposed as a light-emitting device of the light source K3 in place of the G LED.

The arrangement of the white LED 1w will be explained below. FIG. 27 is a sectional view of a fluorescent color-mixing type white LED. The white LED 1w has a B LED 1b connected to a substrate 33 having electrodes 31 and 32. The B LED 1b is molded with a transparent resin 36 mixed with YAG fluorescent particles 35.

The white LED 1w operates as follows. When a driving voltage is applied between the electrodes 31 and 32, the B LED 1b emits blue light Pb. When the blue light Pb collides with the fluorescent particles 35 mixed in the transparent resin 36, the fluorescent particles 35 are excited to cause wavelength conversion, and thus yellow light Pe is emitted from the fluorescent particles 35 as shown in the figure. As a result, the white LED 1w emits fluorescent white light Pwy that is a mixture of blue light Pb emitted from the B LED 1b and output without colliding with the fluorescent particles 35 and yellow light Pe obtained through wavelength conversion of the blue light Pb by colliding with the fluorescent particles 35.

As shown in FIG. 26, the light source apparatus 20 uses an R LED 1r in the light source K1, a G LED 1g in the light source K2, a white LED 1w in the light source K3 and a B LED 1b in the light source K4 to perform color mixing. Therefore, color-mixed light obtained from the R, G and B LEDs is additionally mixed with fluorescent white light Pwy from the white LED 1w. Thus, an illumination apparatus that is bright and superior in color rendering properties can be realized.

Although in the foregoing fourth to sixth embodiments light from four light sources are combined together, there is no particular restriction on the number of light sources used. The present invention is also applicable to a collective light source apparatus that combines together light from light sources of the same wavelength.

According to the foregoing embodiments, incident light from a plurality of light sources can be combined and color-mixed together by a thin optical system using a single prism sheet. Therefore, it is possible to provide a light source apparatus that is small and thin in shape and optically superior in light combining performance.

The present invention is applicable to a collective light source apparatus that combines together light from light sources of the same wavelength and also applicable to a color-mixing type light source apparatus that combines together light from light sources of different wavelengths. Therefore, the present invention has a wide application range and is usable not only as general illumination apparatus but also as light sources for projectors and backlight units for liquid crystal display apparatus.

What is claimed is:

1. A light source apparatus comprising:
    a prism sheet unit having two mutually parallel prism surfaces each having a plurality of mutually parallel fine prism rows, said prism rows on one of said two mutually parallel prism surfaces and those on the other intersecting each other at a predetermined angle in plan view; and
    a plurality of light sources disposed at a light entrance surface side of said prism sheet unit, said light sources each being designed to emit light so that the light is incident on an light entrance surface of said prism sheet unit at a predetermined angle thereto;
    wherein the lights from said light sources are combined or color-mixed together by passing through said two prism surfaces, resulting in combined or color-mixed light being emitted as exiting light.

2. The light source apparatus of claim 1, wherein said prism sheet unit comprises two prism sheets each having on one surface thereof a plurality of mutually parallel fine prism rows, the other surface thereof being a plane surface, said two prism sheets being stacked so that the prism rows of one of said two prism sheets and those of the other intersect each other at a predetermined angle in plan view.

3. The light source apparatus of claim 2, wherein said light sources emit different colors of light, respectively, said exiting light being color-mixed light.

4. The light source apparatus of claim 1, wherein said prism sheet unit comprises a single prism sheet having a plurality of mutually parallel fine prism rows formed on each of two opposite surfaces thereof so that the prism rows on one of said two opposite surfaces and those on the other intersect each other at a predetermined angle in plan view.

5. The light source apparatus of claim 4, wherein said light sources emit different colors of light, respectively.

6. The light source apparatus of claim 1, wherein said light sources are disposed for four zones defined by intersection of the prism rows on said two prism surfaces of said prism sheet unit.

7. The light source apparatus of claim 1, wherein the lights from said light sources are applied along near center lines passing through centers of cross angles of said prism rows on said two prism surfaces of said prism sheet unit.

8. The light source apparatus of claim 1, wherein said light sources are disposed so that the lights emitted from said light sources are directed toward a predetermined converging point of said prism sheet unit.

9. The light source apparatus of claim 8, wherein said light sources are disposed in points symmetry with respect to said predetermined converging point on said prism sheet unit.

10. The light source apparatus of claim 8, wherein said light sources are disposed in line symmetry with respect to an axis that passes through said predetermined converging point on said prism sheet unit.

11. The light source apparatus of claim 1, wherein said prism rows on said two prism surfaces of said prism sheet unit have a same apex angle.

12. The light source apparatus of claim 1, wherein said prism rows on said two prism surfaces of said prism sheet unit have a pitch of 1 μm to 100 μm.

13. The light source apparatus of claim 1, wherein an optical element for collecting light is disposed in front of a light-emitting surface of each of said light sources.

14. The light source apparatus of claim 13, wherein said optical element is a lens having different radii of curvature in longitudinal and transverse directions thereof.

15. The light source apparatus of claim 3, wherein said light sources include red, green and blue light-emitting diode light sources.

16. The light source apparatus of claim 5, wherein said light sources include red, green and blue light-emitting diode light sources.

17. The light source apparatus of claim 15, wherein said red, green and blue light-emitting diode light sources are disposed for three of four zones defined by intersection of the prism rows on said two prism sheets of said prism sheet unit, respectively, and a green light-emitting diode light source is disposed for a remaining one of said four zones.

18. The light source apparatus of claim 16, wherein said red, green and blue light-emitting diode light sources are disposed for three of four zones defined by intersection of the prism rows on said two prism surfaces of said prism sheet unit, respectively, and a green light-emitting diode light source is disposed for a remaining one of said four zones.

19. The light source apparatus of claim 15, wherein said red, green and blue light-emitting diode light sources are disposed for three of four zones defined by intersection of the prism rows on said two prism sheets of said prism sheet unit, respectively, and a blue YAG light-emitting diode light source is disposed for a remaining one of said four zones.

20. The light source apparatus of claim 16, wherein said red, green and blue light-emitting diode light sources are disposed for three of four zones defined by intersection of the prism rows on said two prism surfaces of said prism sheet unit, respectively, and a blue YAG light-emitting diode light source is disposed for a remaining one of said four zones.

* * * * *